United States Patent
Motoi et al.

(10) Patent No.: US 11,411,663 B2
(45) Date of Patent: Aug. 9, 2022

(54) PROCESSING DEVICE, PROCESSING METHOD, PROCESSING PROGRAM AND CALIBRATION DEVICE FOR ARRAY ANTENNA

(71) Applicant: NEC Corporation, Tokyo (JP)

(72) Inventors: Keiichi Motoi, Tokyo (JP); Naoki Oshima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 461 days.

(21) Appl. No.: 16/494,805

(22) PCT Filed: Apr. 16, 2018

(86) PCT No.: PCT/JP2018/015637
§ 371 (c)(1),
(2) Date: Sep. 17, 2019

(87) PCT Pub. No.: WO2018/194004
PCT Pub. Date: Oct. 25, 2018

(65) Prior Publication Data
US 2020/0274627 A1 Aug. 27, 2020

(30) Foreign Application Priority Data
Apr. 19, 2017 (JP) .............................. JP2017-082710

(51) Int. Cl.
*H04B 17/21* (2015.01)
*H04B 17/12* (2015.01)
(Continued)

(52) U.S. Cl.
CPC ............. *H04B 17/21* (2015.01); *H04B 17/12* (2015.01); *H04B 17/14* (2015.01); *H04B 17/29* (2015.01)

(58) Field of Classification Search
CPC ....................................................... H04B 17/21
See application file for complete search history.

(56) References Cited

U.S. PATENT DOCUMENTS

| | | | | |
|---|---|---|---|---|
| 3,859,781 A | * | 1/1975 | Sauer | G04C 11/084 368/163 |
| 4,575,709 A | * | 3/1986 | Tomlinson | H04N 11/24 341/145 |
| 7,292,877 B2 | | 11/2007 | Yoon et al. | |

FOREIGN PATENT DOCUMENTS

| | | |
|---|---|---|
| JP | 57-93267 A | 6/1982 |
| WO | 2006/051614 A1 | 5/2006 |

OTHER PUBLICATIONS

Mano et al., "A Method for Measuring Amplitude and Phase of Each Radiating Element of a Phased Array Antenna", the Japanese Paper of the Institute of Electronics, Information and Communication Engineers (B), vol. J65-B, No. 5, pp. 555-560, May 1982, 7 pages total.

(Continued)

*Primary Examiner* — Hsinchun Liao
(74) *Attorney, Agent, or Firm* — Sughrue Mion, PLLC

(57) ABSTRACT

In order to enable a reduction in the time required to calibrate the amplitude phase of an antenna device, this processing device is provided with: a setting unit group which performs setting from a predetermined three or more-valued phase value regarding the phase value of a signal received by each of a plurality of antenna elements or a signal transmitted from each of the antenna elements with respect to a calibration signal, on the basis of information extracted from one control information, and derives set signals that are signals on which the setting has been performed; and a computing unit which outputs a correlation value that is a value indicating a correlation between the sum of the set signals and the control information.

14 Claims, 9 Drawing Sheets

(51) Int. Cl.
   *H04B 17/14*   (2015.01)
   *H04B 17/29*   (2015.01)

(56) References Cited

OTHER PUBLICATIONS

Kihira et al. "A Calibration Method Using Orthogonal Codes for Phased Array Antennas" The Technical Report of the Institute of Electronics, Information and Communication Engineers, Technical Report, A-P 2005-115, vol. 105, No. 399, pp. 25-30, Nov. 2005, 6 pages total.
International Search Report dated Jul. 10, 2018 issued by the International Searching Authority in International application No. PCT/JP2018/015637.
Written Opinion dated Jul. 10, 2018 issued by the International Searching Authority in International application No. PCT/JP2018/015637.

\* cited by examiner

000
PROCESSING DEVICE, PROCESSING METHOD, PROCESSING PROGRAM AND CALIBRATION DEVICE FOR ARRAY ANTENNA

This application is a National Stage Entry of PCT/JP2018/015637 filed on Apr. 16, 2018, which claims priority from Japanese Patent Application 2017-082710 filed on Apr. 19, 2017, the contents of all of which are incorporated herein by reference, in their entirety.

TECHNICAL FIELD

The present invention relates to calibration of an antenna.

BACKGROUND ART

Due to a rapid increase in mobile traffic in recent years, high-precision beam control in an antenna device on which many antenna elements are installed for achieving millimeter waveband communication having strong directivity designed for large-capacity communication is desired. In order to form a beam pattern that can achieve such high-precision beam control, it is important to measure and adjust an amplitude phase deviation of each antenna element with high precision.

As a technique for measuring an amplitude phase deviation of an array antenna, PTL 1 and NPL 1 disclose a technique of changing a phase value of a phase shifter included in each antenna element and perform calibration from information about amplitude intensity of a synthesized output. This method is referred to as a rotating-element electric-field vector (RVE) method.

Further, PTL 2 and NPL 2 disclose a method of calculating an amplitude phase deviation of each antenna element by performing phase modulation on each antenna element by using a two-valued phase value (0° and 180°) of a phase shifter included in each antenna element.

CITATION LIST

Patent Literature

[PTL 1] Japanese Unexamined Patent Application Publication No. S57-93267
[PTL 2] International Patent Publication No. WO2006/051614

Non Patent Literature

[NTL 1] Kiyoshi Mano, Takashi Kataki, "Measurement Method of Component Amplitude Phase in Phased Array Antenna-Component Electrical Field Vector Rotation Method", the Japanese Paper of the Institute of Electronics, Information and Communication Engineers (B), vol. J65-B, no. 5, pp. 555-560, May 1982.
[NTL 2] Kazunari Kibira. Kazushi Hirata, Hiroaki Miyashita, Shigeru Makino, "Calibration Method to Phased Array Antenna using Orthogonal Code" The Technical Report of the Institute of Electronics, Information and Communication Engineers A•P, (Antenna•Transmission), Vol. 105, No. 399, pp. 25-30, November 2005.

SUMMARY OF INVENTION

Technical Problem

In the calibration method described in PTL 1 and NPL 1, a change in signal intensity having a phase value of a phase setting unit of each antenna element being successively changed is measured, and the measurement needs to be performed on all antenna elements. Thus, the calibration method has a problem that a long time is required for many measurements.

Further, in the calibration method described in PTL 2 and NPL 2, a phase shifter of each antenna element performs phase modulation on an input signal by a two-valued phase value. Thus, the calibration method needs to perform a measurement for a plurality of times in order to reflect a phase error of all phase values of a phase setting unit into a calibration coefficient. In a case of the calibration method disclosed in PTL 2, a measurement of a combination of phase values in $2^{m-1}$ groups is needed in a digital phase shifter of m bits. Therefore, the method has a problem that time required for calibration increases with an increase in the number of bits of a phase setting unit.

An object of the present invention is to provide a processing device and the like that are able to reduce time required to calibrate an amplitude phase of an antenna device.

Solution to Problem

A processing device of the present invention includes: a setting unit group that performs, with information extracted from one piece of control information, setting from a predetermined three or more-valued phase value on a phase value of a reception signal by each of a plurality of antenna elements or a transmission signal from each of the antenna elements for a calibration signal, and derives a setting signal being a signal on which the setting is performed; and a computing unit that outputs a correlation value being a value indicating a correlation between a sum of the setting signals and the control information.

Advantageous Effects of Invention

A processing device and the like according to the present invention are able to reduce time required to calibrate an amplitude phase of an antenna device.

EXAMPLE EMBODIMENT

Hereinafter, embodiments (example embodiments) for implementing the present invention are described in detail with reference to drawings.

First Example Embodiment

A first example embodiment is an example embodiment related to a calibration system that performs calibration on an amplitude phase deviation by performing phase modulation (hereinafter referred to as "multivalued phase modulation") on a multivalued phase value by expanding an Hadamard matrix.

[Configuration]

Figure 1:
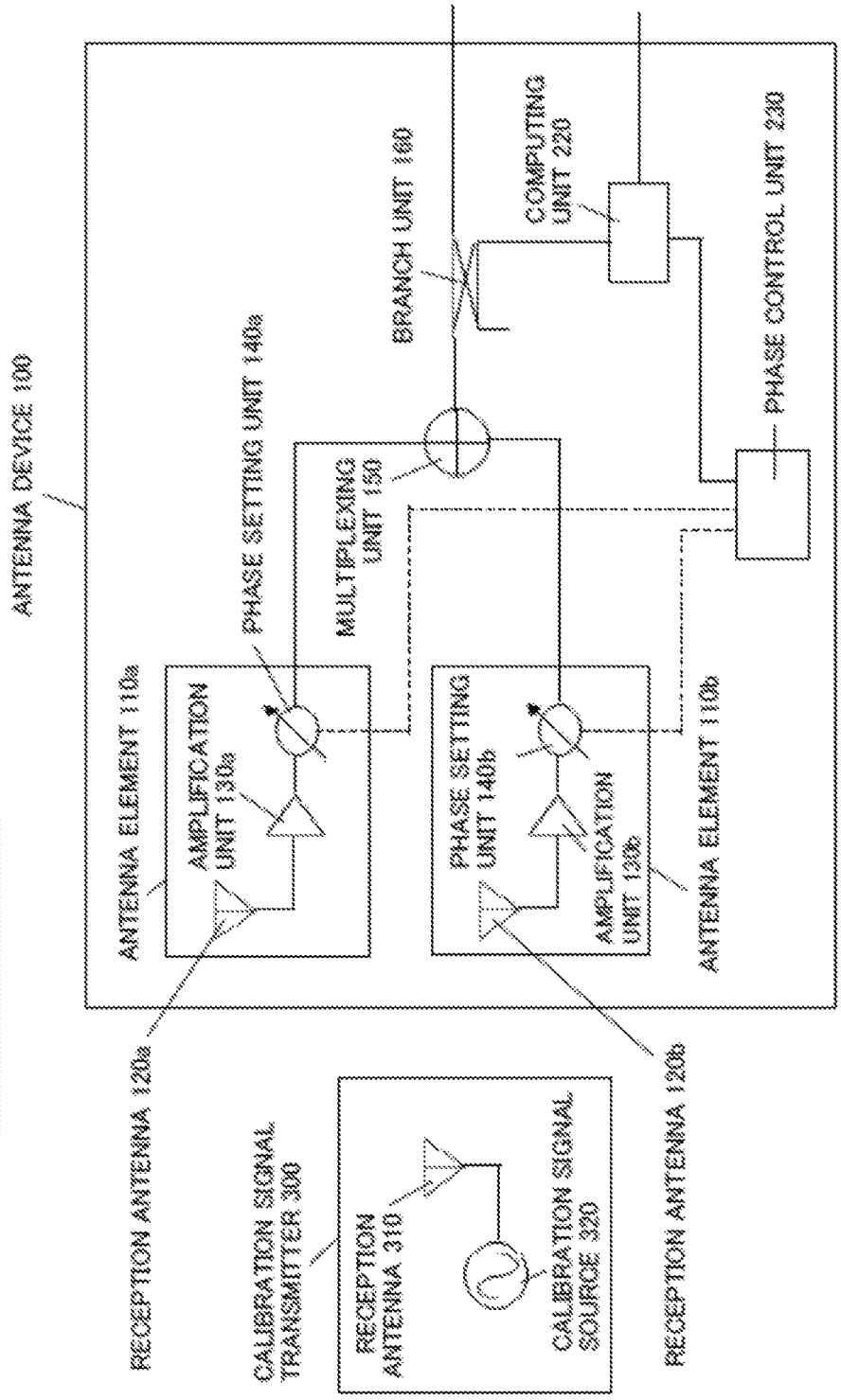
FIG. 1 is a schematic diagram illustrating a configuration example of a calibration system according to a first example embodiment.

FIG. 1 is a schematic diagram illustrating a configuration of a calibration system 400 being an example of a calibration system according to the first example embodiment. Note that a path indicated by a broken line in FIG. 1 is a path of a control signal.

The calibration system 400 includes a calibration signal transmitter 300 and an antenna device 100.

The calibration signal transmitter 300 includes a calibration signal source 320 and a transmission antenna 310.

The calibration signal source 320 generates a calibration signal. The calibration signal source 320 sends the generated calibration signal to the transmission antenna 310.

The transmission antenna 310 converts the calibration signal sent from the calibration signal source 320 into a wireless radio wave, and transmits the converted wireless radio wave toward the antenna device 100.

The antenna device 100 is a device that detects a relative amplitude phase deviation between array antenna elements by causing each phase setting unit of each antenna element illustrated in FIG. 1 to perform phase modulation of a three or more-valued phase value.

The antenna device 100 includes antenna elements 110a and 110b, a multiplexing unit 150, a branch unit 160, a phase control unit 230, and a computing unit 220.

The phase control unit 230 generates control information. First control information being control information that controls a phase value set, by the phase setting unit 140a, for an input signal to a phase setting unit 140a is included in the control information. Further, second control information being control information that controls a phase value set, by the phase setting unit 140b, for an input signal to a phase setting unit 140b is included in the control information.

As described later, the control information is, for example, information indicated by a matrix having, as an element, a phase value set by each of the phase setting units 140a and 140b. Then, a predetermined column of the element is associated with the first control information. Further, another column of the element is associated with the second control information.

The phase control unit 230 generates (extracts) the first control information and the second control information from the generated control information. Then, the phase control unit 230 sends the first control information to the phase setting unit 140a. Further, the phase control unit 230 sends the second control information to the phase setting unit 140b.

Furthermore, the phase control unit 230 sends the control information not as a control signal but as a processing signal to the computing unit 220.

The antenna element 110a includes a reception antenna 120a, an amplification unit 130a, and the phase setting unit 140a.

The reception antenna 120a receives a radio wave transmitted from the calibration signal transmitter 300, and converts the radio wave into an electric signal. The reception antenna 120a sends the converted electric signal to the amplification unit 130a.

The amplification unit 130a generates a signal acquired by amplifying the signal sent from the reception antenna 120a. The amplification unit 130a sends the amplified signal to the phase setting unit 140a. The amplification unit 130a is typically a low noise amplifier.

The phase setting unit 140a sets a phase value of the signal sent from the amplification unit 130a to a phase value designated by the first control information according to the first control information sent from the phase control unit 230a. The phase setting unit 140a sends the signal having the set phase value to the multiplexing unit 150. A phase shifter and a phase unit on the market can be selected and used as the phase setting unit 140a.

The antenna element 110b includes a reception antenna 120b, an amplification unit 130b, and the phase setting unit 140b.

For description of the antenna element 110b, the following reading is performed on the description of the antenna element 110a described above. In other words, the reception antenna 120a, the amplification unit 130a, and the phase setting unit 140a are read as the reception antenna 120b, the amplification unit 130b, and the phase setting unit 140b, respectively. Further, a first control signal is read as a second control signal.

The multiplexing unit 150 multiplexes the signal sent from each of the antenna elements 110a and 110b, and outputs the multiplexed signal to the branch unit 160.

The branch unit 160 separates the signal sent from the multiplexing unit 150 into two output signals. The branch unit 160 sends one of the two output signals to the computing unit 220. Further, the branch unit 160 outputs the other of the two output signals to the outside of the antenna device 100. The branch unit 160 is, for example, a coupler.

The computing unit 220 derives a correlation value being a value indicating a correlation between the control information sent from the phase control unit 230 and the multiplexed signal sent from the branch unit 160. The computing unit 220 derives calibration information for performing calibration on the antenna elements 110a and 110b from the derived correlation value.

In the description above, a case where the antenna device includes the two antenna elements is described. However, the antenna device according to the first example embodiment may include three or more antenna elements.

[Operation]

Next, an operation example of an operation performed by the calibration system according to the first example embodiment is described. The operation example is an operation example when each of the phase setting units 140a and 140b is a phase setting unit (for example, a phase unit) of N bits (N is an integer of two or more). Furthermore, the operation example is an operation example when phase values included in the control information generated by the phase control unit 230 are four values.

When K antenna elements are calibrated, first, an Hadamard matrix $H_N$ in a dimension that satisfies $N \geq K$ is defined by Equation 1-1 and Equation 1-2 indicated as follows (see PTL 2 and NPL 2).

$$H_2(\theta_1) = \exp(i\theta_1)\begin{bmatrix} 1 & 1 \\ 1 & -1 \end{bmatrix},$$

$$H_{2N}(\theta_1) = \begin{bmatrix} H_N(\theta_1) & H_N(\theta_1) \\ H_N(\theta_1) & -H_N(\theta_1) \end{bmatrix} \quad \text{EQUATION 1-1}$$

$$H_4(\theta_1) = \exp(i\theta_1)\begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{EQUATION 1-2}$$

Herein, $\theta_1$ represented in Equation 1-1 and Equation 1-2 is a phase value.

Next, an expansion Hadamard matrix expanded by combining an Hadamard matrix generated from a group (phase value group) of phase values of $(\theta_2, \theta_2+180°)$ in order to correspond to multivalued phase modulation is defined by Equation 1-3 indicated as follows. Herein, the phase value group of $(\theta_2, \theta_2+180°)$ is a phase value group different from a phase value group of $(\theta_1, \theta_1+180°)$. Each element of the matrix represented in Equation 1-3 corresponds to a phase value column of the multivalued phase modulation.

$$H_{2N}(\theta_1, \theta_2) = \begin{bmatrix} H_N(\theta_1) & H_N(\theta_1) & H_N(\theta_2) & H_N(\theta_2) \\ H_N(\theta_1) & -H_N(\theta_1) & H_N(\theta_2) & -H_N(\theta_2) \end{bmatrix} \quad \text{EQUATION 1-3}$$

Further, each row of $H_{2N}(\theta_1, \theta_2)$ is defined as a row vector $a_i$. The row vector $a_i$ satisfies Equation 1-4 indicated as follows.

$$a_i \cdot a_k^* = \begin{cases} 2N & (i = k) \\ 0 & (i \neq k) \end{cases} \quad \text{EQUATION 1-4}$$

It is assumed that the row vector $a_i$ is used as a code column of phase value control of the phase setting unit, and is a phase modulation signal when a calibration reference signal $S(t)$ is received. Then, an output signal $x_i(t)$ of each antenna element is represented in Equation 1-5 indicated as follows.

$$x_i(t) = A_i e^{i\phi_i} a_i(t) S(t) \quad \text{EQUATION 1-5}$$

Then, a multiplexed signal $y(t)$ of a signal from each antenna element multiplexed in the multiplexing unit 150 is represented in Equation 1-6 indicated as follows.

$$y(t) = \sum_{i=1}^{n} x_i(t) = \sum_{i=1}^{n} A_i e^{i\phi_i} a_i(t) S(t) \quad \text{EQUATION 1-6}$$

Next, the computing unit 220 derives a cross-correlation value $\beta_k$ of the multiplexed signal $y(t)$ represented in Equation 1-6 and any $a_i$ from Equation 1-7 indicated as follows. It is assumed herein that an amplitude phase deviation within a period is constant in Equation 1-7.

$$\beta_k = \int \frac{y(t)}{S(t)} \cdot a_k(t)^* dt \quad \text{EQUATION 1-7}$$

$$= \int \left( \sum_{i=1}^{n} A_i e^{i\phi_i} a_i(t) \right) \cdot a_k(t)^* dt$$

$$= \sum_{i=1}^{n} \left[ A_i e^{i\phi_i} \int (a_i(t) a_k(t)^*) dt \right]$$

$$= A_k e^{i\phi_k}$$

By the operation described above, the computing unit 220 can collectively acquire an amplitude fluctuation and a phase fluctuation of each antenna element for a plurality of phase values that may be set for an input signal by each phase setting unit. Thus, the computing unit 220 can derive a relative calibration coefficient $\rho_k$ of each antenna element from Equation 1-8 indicated as follows with reference to a cross-correlation value $\beta_1$ when $k=1$, for example.

$$\rho_k = \frac{\beta_k}{\beta_1} = \frac{A_k e^{i\phi_k}}{A_1 e^{i\phi_1}} \quad \text{EQUATION 1-8}$$

On the other hand, phase modulation of a four-valued phase value can be achieved by using, as a phase modulation code of each antenna element, each of lower three rows on a rightmost side of $H_4(\theta_1, \theta_2)$ of Equation 1-9 indicated as follows for an antenna device including three antenna elements.

$$H_4(\theta_1, \theta_2) = (H_4(\theta_1) \mid H_4(\theta_2)) = \quad \text{EQUATION 1-9}$$

$$\left( \exp(i\theta_1) \begin{bmatrix} 1 & 1 & 1 & 1 \\ 1 & -1 & 1 & -1 \\ 1 & 1 & -1 & -1 \\ 1 & -1 & -1 & 1 \end{bmatrix} \middle| \exp(i\theta_2) \begin{bmatrix} 1 & 1 & 1 & 1 \\ 1 & -1 & 1 & -1 \\ 1 & 1 & -1 & -1 \\ 1 & -1 & -1 & 1 \end{bmatrix} \right)$$

On the other hand, any of second to seventh rows on a rightmost side of $H_8(\theta_1, \theta_2)$ in Equation 1-10 indicated as follows may be each used as a phase modulation code of each antenna element for an antenna device including four to seven antenna elements.

$$H_8(\theta_1, \theta_2) = (H'_8(\theta_1) \mid H'_8(\theta_2)) = \qquad \text{EQUATION 1-10}$$

$$\left( \exp(i\theta_1) \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \middle| \exp(i\theta_2) \begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix} \right)$$

Further, when further multivalued phase modulation is performed, the expansion Hadamard matrix may be further expanded as in Equation 1-11 indicated as follows.

$$H_{2N}(\theta_1, \theta_2, \theta_3) = \qquad \text{EQUATION 1-11}$$

$$\begin{bmatrix} H_N(\theta_1) & H_N(\theta_1) & H_N(\theta_2) & H_N(\theta_2) & H_N(\theta_3) & H_N(\theta_3) & H_N(\theta_4) & H_N(\theta_4) \\ H_N(\theta_1) & -H_N(\theta_1) & H_N(\theta_2) & -H_N(\theta_2) & H_N(\theta_3) & -H_N(\theta_3) & H_N(\theta_4) & -H_N(\theta_4) \end{bmatrix}$$

As described above, the calibration system according to the first example embodiment multivalues a phase value column included in control information that controls a phase of each setting unit. In this way, the calibration system can cause the control information including the phase value column to perform setting of the phase in each setting unit.

Advantageous Effect

The calibration system according to the first example embodiment multivalues a phase value column included in control information for setting a phase for an input signal in each setting unit. In this way, the calibration system can cause one piece of control information constituted of a matrix including the phase value column to perform setting of the phase in each setting unit. Thus, the calibration system can achieve the setting in a short time.

Furthermore, the calibration system derives a correlation value of a multiplexed signal acquired by multiplexing a reception signal that sets a phase in each setting unit, and control information. Thus, the calibration system can derive a correlation value by a series of (one) computing processing.

As described above, the calibration system can achieve derivation of the correlation value in a short time.

Furthermore, the calibration system performs derivation of calibration information (calibration coefficient) of an amplitude phase of each antenna element from the correlation value. As described above, time required to derive the correlation value is short, and thus the calibration system can achieve derivation of calibration information in a short time.

Second Example Embodiment

A second example embodiment is an example embodiment related to a calibration system using four or eight phase values for each antenna element.

[Configuration]

A calibration system according to the second example embodiment is the same as the calibration system 400 according to the first example embodiment illustrated in FIG. 1. The description of the calibration system 400 is as described above.

[Operation]

Next, an operation example performed by the calibration system according to the second example embodiment is described. The operation example is an operation example when each of phase setting units 140a and 140b is a phase setting unit of N bits (N is an integer of two or more). Furthermore, the operation example is an operation example when phase values included in control information sent from a phase control unit 230 to each of the phase setting units 140a and 140b are four values.

Herein, an execution column expression of a quaternion $(a+b_i+c_j+d_k$ (herein, a, b, c, and d are real numbers, and i, j, and k represent imaginary number units of a quaternion)) is as in Equation 2-1 indicated as follows.

$$\begin{pmatrix} a & b & c & d \\ -b & a & -d & c \\ -c & d & a & -b \\ -d & -c & b & a \end{pmatrix} = \qquad \text{EQUATION 2-1}$$

$$a \begin{pmatrix} 1 & 0 & 0 & 0 \\ 0 & 1 & 0 & 0 \\ 0 & 0 & 1 & 0 \\ 0 & 0 & 0 & 1 \end{pmatrix} + b \begin{pmatrix} 0 & 1 & 0 & 0 \\ -1 & 0 & 0 & 0 \\ 0 & 0 & 0 & -1 \\ 0 & 0 & 1 & 0 \end{pmatrix} +$$

$$c \begin{pmatrix} 0 & 0 & 1 & 0 \\ 0 & 0 & 0 & 1 \\ -1 & 0 & 0 & 0 \\ 0 & -1 & 0 & 0 \end{pmatrix} + d \begin{pmatrix} 0 & 0 & 0 & 1 \\ 0 & 0 & -1 & 0 \\ 0 & 1 & 0 & 0 \\ -1 & 0 & 0 & 0 \end{pmatrix}$$

$\exp(i\theta) \times 1 = \exp(i\theta) \times \exp(i0)$ is substituted for a in Equation 2-1. Further, $\exp(i\theta) \times i = \exp(i\theta) \times \exp(i\pi/2)$ is substituted for b. Further, $\exp(i\theta) \times (-1) = \exp(i\theta) \times \exp(i\pi)$ is substituted for c. Further, $\exp(i\theta) \times (-i) = \exp(i\theta) \times \exp(i3\pi/2)$ is substituted for d. Then, $C'_4$ defined in Equation 2-1 is defined, and is used as one example of a matrix $C'_4$ that generates the control information described above. Further, each row of $C'_4$ is defined as a row vector $b_i$. Then, $C'_4$ is represented by Equation 2-2 indicated as follows.

$$C'_4(\theta) = \exp(i\theta) \begin{pmatrix} e^{i0} & e^{i\frac{\pi}{2}} & e^{i\pi} & e^{i\frac{3\pi}{2}} \\ e^{i\frac{3\pi}{2}} & e^{i0} & e^{i\frac{\pi}{2}} & e^{i\pi} \\ e^{i0} & e^{i\frac{3\pi}{2}} & e^{i0} & e^{i\frac{3\pi}{2}} \\ e^{i\frac{\pi}{2}} & e^{i0} & e^{i\frac{\pi}{2}} & e^{i0} \end{pmatrix} =$$
$$\exp(i\theta)\begin{pmatrix} 1 & i & -1 & -i \\ -i & 1 & i & -1 \\ 1 & -i & 1 & -i \\ i & 1 & i & 1 \end{pmatrix}$$

EQUATION 2-2

Further, each row vector $b_i$ of $C'_4$ satisfies Equation 2-3 indicated as follows.

$$b_i \cdot b_k^* = \begin{cases} 4 & (i = k) \\ 0 & (i \neq k) \\ 4i & (i = 1, k = 2 \text{ or } i = 4, k = 3) \end{cases}$$

EQUATION 2-3

However, the row vector $b_i$ alone cannot guarantee orthogonality for any $i \neq k$. Thus, a matrix $C_4$ expanded by using a conjugation matrix $(C'_4(\theta))^*$ of the matrix $C'_4(\theta)$ is defined by Equation 2-4 indicated as follows.

$$C_4(\theta_1, \theta_2) =$$

$$(C'_4(\theta_1) | (C'_4(\theta_2))^*) = \left( \exp(i\theta_1) \begin{bmatrix} 1 & i & -1 & -i \\ -i & 1 & i & -1 \\ 1 & -i & 1 & -i \\ i & 1 & i & 1 \end{bmatrix} \right.$$
$$\left. \exp(i\theta_2) \begin{bmatrix} 1 & -i & -1 & i \\ i & 1 & -i & -1 \\ 1 & i & 1 & i \\ -i & 1 & -i & 1 \end{bmatrix} \right)$$

EQUATION 2-4

The row vector $a_i$ satisfies Equation 2-5 indicated as follows. Thus, a calibration coefficient can be derived similarly to the case in the first example embodiment.

$$a_i \cdot a_k^* = \begin{cases} 8 & (i = k) \\ 0 & (i \neq k) \end{cases}$$

EQUATION 2-5

At this time, when $\theta_1 = \theta_2 = 0$ (that is, a phase of four values of 0°, 90°, 180°, and 270°) is used in an antenna device according to the second example embodiment, the matrix $C_4$ is represented by Equation 2-6 indicated as follows.

$$C_4(0,0) = (C'_4(0) | (C'_4(0))^*)$$

$$= \begin{pmatrix} 1 & i & -1 & -i & 1 & -i & -1 & i \\ -i & 1 & i & -1 & i & 1 & -i & -1 \\ 1 & -i & 1 & -i & 1 & i & 1 & i \\ i & 1 & i & 1 & -i & 1 & -i & 1 \end{pmatrix}$$

EQUATION 2-6

A matrix $C_{4,1\sim2}$ of upper two rows on a rightmost side of Equation 2-6, that is:

$$C_{4,1\sim2}(0,0) = \left( \begin{bmatrix} 1 & i & -1 & -i \\ -i & 1 & i & -1 \end{bmatrix} \begin{bmatrix} 1 & -i & -1 & i \\ i & 1 & -i & -1 \end{bmatrix} \right)$$

EQUATION 2-7 is each used as a code column of phase value control of a phase setting unit of each antenna element.

On the other hand, when $\theta_1 = 0$ and $\theta_2 = \pi/4$ (that is, a phase of eight values of 0°, 90°, 180°, 270°, 45°, 135°, 225°, and 315°) are used, the matrix $C_4$ is represented by Equation 2-8 indicated as follows.

$$C_4\left(0, \frac{\pi}{4}\right) =$$

$$\left( \begin{bmatrix} 1 & i & -1 & -i \\ -i & 1 & i & -1 \\ 1 & -i & 1 & -i \\ i & 1 & i & 1 \end{bmatrix} \left| \exp\left(-i\frac{\pi}{4}\right) \begin{bmatrix} 1 & -i & -1 & i \\ i & 1 & -i & -1 \\ 1 & i & 1 & i \\ -i & 1 & -i & 1 \end{bmatrix} \right. \right)$$

EQUATION 2-8

A matrix $C_{4,1\sim2}$ of upper two rows on a right side of Equation 2-8, that is:

$$C_{4,1\sim2}\left(0, \frac{\pi}{4}\right) =$$

$$\left( \begin{bmatrix} 1 & i & -1 & -i \\ -i & 1 & i & -1 \end{bmatrix} \left| \exp\left(-i\frac{\pi}{4}\right) \begin{bmatrix} 1 & -i & -1 & i \\ i & 1 & -i & -1 \end{bmatrix} \right. \right)$$

EQUATION 2-9 is each used as a code column of phase value control of the phase setting unit of each of antenna elements 110a and 110b.

Advantageous Effect

First, the calibration system according to the second example embodiment achieves an advantageous effect similar to that of the calibration system according to the first example embodiment.

In addition to that, even when a phase of eight values is used, the calibration system has a code length of eight, which is shorter than that in the first example embodiment. Thus, the calibration system achieves a further advantageous effect of reducing a load when digital computing is performed.

Third Example Embodiment

A third example embodiment is an example embodiment related to a calibration system including three or more antenna elements.

[Configuration]

Figure 2:
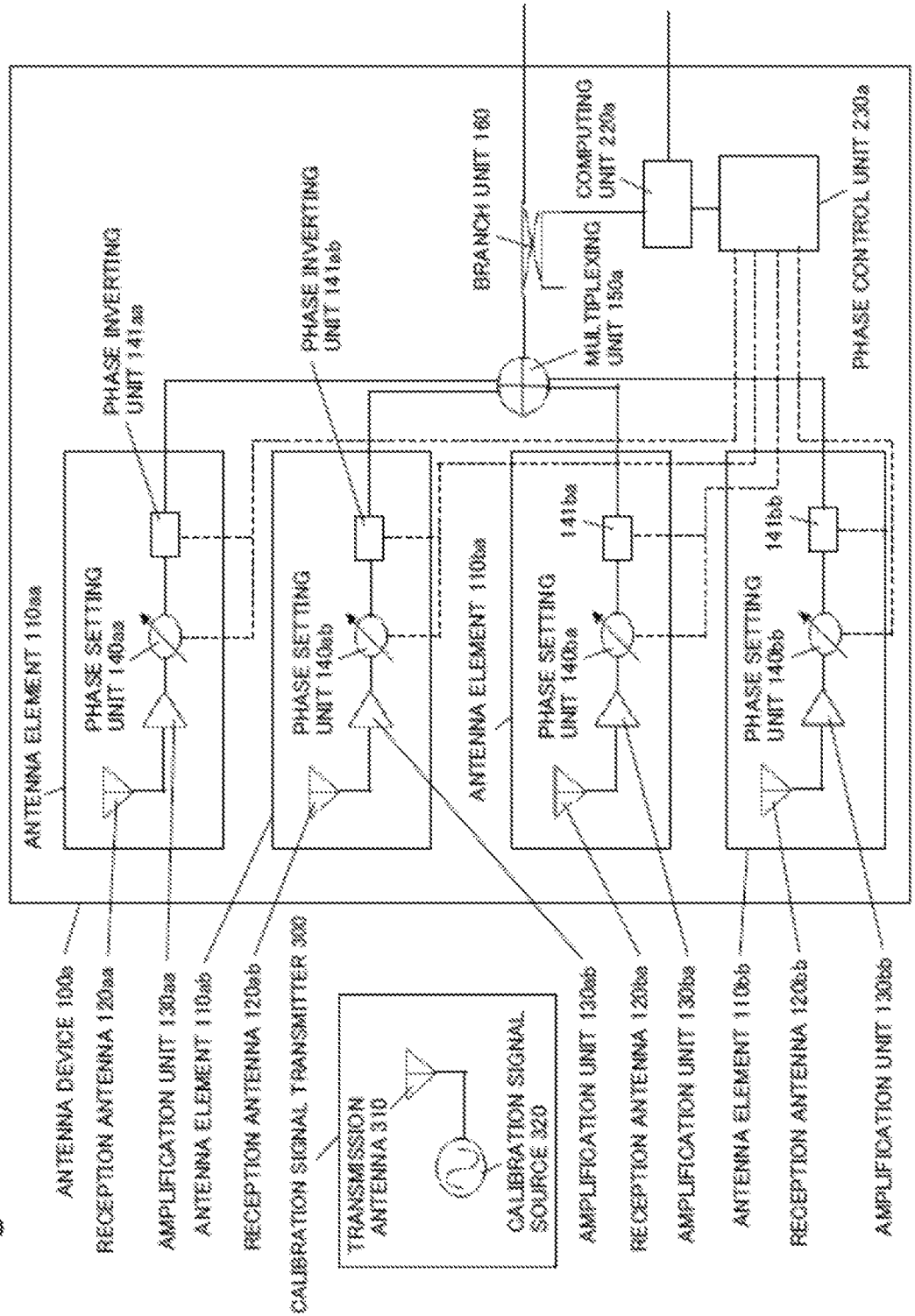
FIG. 2 is a schematic diagram illustrating a configuration example of a calibration system according to a third example embodiment.

FIG. 2 is a schematic diagram illustrating a configuration of a calibration system 400a being an example of the calibration system according to the third example embodiment. Note that a path indicated by a broken line in FIG. 2 is a path of a control signal.

The calibration system 400a includes a calibration signal transmitter 300 and an antenna device 100a.

Description of the calibration signal transmitter 300 illustrated in FIG. 2 is the same as the description of the calibration signal transmitter 300 illustrated in FIG. 1.

The antenna device 100a is a device that detects a relative amplitude phase deviation between antenna elements by causing each phase setting unit of each antenna element to perform phase modulation of at least a four-valued phase value.

The antenna device 100a includes antenna elements 110aa to 110bb, a multiplexing unit 150a, a branch unit 160, a phase control unit 230a, and a computing unit 220a.

The phase control unit 230a generates A control information.

First A control information being control information that controls a phase value set for an input signal by a phase setting unit 140aa is included in the A control information. Further, second A control information being control information that controls a phase value set for an input signal by a phase setting unit 140ab is included in the A control information. Further, third A control information being control information that controls a phase value set for an input signal by a phase setting unit 140ba is included in the A control information. Further, fourth A control information being control information that controls a phase value set for an input signal by a phase setting unit 140bb is included in the A control information.

Fifth A control information being control information indicating whether or not a phase inverting unit 141aa inverts a phase of an input signal is included in the A control information. Sixth A control information being control information indicating whether or not a phase inverting unit 141ab inverts a phase of an input signal is included in the A control information. Seventh A control information being control information indicating whether or not a phase inverting unit 141ba inverts a phase of an input signal is included in the A control information. Eighth A control information being control information indicating whether or not a phase inverting unit 141bb inverts a phase of an input signal is included in the A control information.

As described later, the A control information is, for example, information indicated by a matrix having, as an element, a phase value set by each of the phase setting units 140aa to 140bb and the phase inverting units 141aa to 141bb. Then, for example, a predetermined column of the element is associated with each piece of the first A to eighth A control information.

The phase control unit 230a generates (extracts) each piece of the first A control information to the fourth A control information from the generated A control information.

Then, the phase control unit 230a sends the second A control information to the phase setting unit 140ab. Further, the phase control unit 230a sends the second A control information to the phase setting unit 140ab. Further, the phase control unit 230a sends the third A control information to the phase setting unit 140ba. Further, the phase control unit 230a sends the fourth A control information to the phase setting unit 140bb. Further, the phase control unit 230a sends the fifth A control information to the phase inverting unit 141aa. Further, the phase control unit 230a sends the sixth A control information to the phase inverting unit 141ab. Further, the phase control unit 230a sends the seventh A control information to the phase inverting unit 141ba. Further, the phase control unit 230a sends the eighth A control information to the phase inverting unit 141bb.

Furthermore, the phase control unit 230a sends the above-described A control information not as a control signal but as a processing signal to the computing unit 220a.

The antenna element 110aa includes a reception antenna 120aa, an amplification unit 130aa, the phase setting unit 140aa, and the phase inverting unit 141aa.

The reception antenna 120aa receives a radio wave emitted into a wireless space by the calibration signal transmitter 300, and converts the radio wave into an electric signal. The reception antenna 120aa sends the converted electric signal to the amplification unit 130aa.

The amplification unit 130aa generates a signal acquired by amplifying the signal sent from the reception antenna 120aa. The amplification unit 130aa sends the amplified signal to the phase setting unit 140aa. The amplification unit 130aa is typically a low noise amplification unit.

The phase setting unit 140aa sets a phase value of the signal sent from the amplification unit 130a according to the control information sent from the phase control unit 230a. The phase setting unit 140a sends the signal having the set phase value to the multiplexing unit 150a.

The antenna element 110ab includes a reception antenna 120ab, an amplification unit 130ab, the phase setting unit 140ab, and the phase inverting unit 141ab.

For description of the antenna element 110ab, the following reading is performed on the description of the antenna element 110aa described above. Namely, the reception antenna 120aa is read as the reception antenna 120ab. Further, the amplification unit 130aa is read as the amplification unit 130ab. Further, the phase setting unit 140aa is read as the phase setting unit 140ab. Further, the phase inverting unit 141aa is read as the phase inverting unit 141ab.

The antenna element 110ba includes a reception antenna 120ba, an amplification unit 130ba, the phase setting unit 140ba, and the phase inverting unit 141ba.

For description of the antenna element 110ba, the following reading is performed on the description of the antenna element 110aa described above. Namely, the reception antenna 120aa is read as the reception antenna 120ba. Further, the amplification unit 130aa is read as the amplification unit 130ba. Further, the phase setting unit 140aa is read as the phase setting unit 140ba. Further, the phase inverting unit 141aa is read as the phase inverting unit 141ba.

The antenna element 110bb includes a reception antenna 120bb, an amplification unit 130bb, the phase setting unit 140bb, and the phase inverting unit 141bb.

For description of the antenna element 110bb, the following reading is performed on the description of the antenna element 110aa described above. Namely, the reception antenna 120aa is read as the reception antenna 120bb. Further, the amplification unit 130aa is read as the amplification unit 130bb. Further, the phase setting unit 140aa is read as the phase setting unit 140bb. Further, the phase inverting unit 141aa is read as the phase inverting unit 141bb.

The multiplexing unit 150a multiplexes the signal sent from each of the antenna elements 110aa to 110bb, and outputs the multiplexed signal to the branch unit 160.

The branch unit 160 separates the signal sent from the multiplexing unit 150 into two output signals. The branch unit 160 sends one of the two output signals to the computing unit 220a. Further, the branch unit 160 outputs the other of the two output signals to the outside of the antenna device 100a.

The computing unit 220a derives a correlation value being a value indicating a correlation between each piece of the first A to fourth A control information sent from the phase control unit 230a and the signal sent from the branch unit 160. Furthermore, the computing unit 220 derives calibration information for calibrating a phase of each antenna element from the correlation value.

FIG. 2 illustrates the example when the antenna device includes the four antenna elements. However, the number of antenna elements included in the antenna device according to the second example embodiment may be any as long as it is three or more.

[Operation]

Next, an operation example of the calibration system according to the third example embodiment is described. The operation example is an operation example when each of the phase setting units 140aa to 140bb is a phase setting unit (a phase unit) of N bits (N is an integer of two or more). Furthermore, the operation example is an operation example when phase values included in control information sent from the phase control unit 230a to each of the phase setting units 140aa to 140bb are four values.

The matrix $C_4$ represented by Equation 2-4 described in the first example embodiment is used as a matrix $C_4$ that generates the A control information described above.

At this time, when $\theta_1 = \theta_2 = 0$, that is, a phase of four values of 0°, 90°, 180°, and 270° is used, the matrix $C_4$ is represented by Equation 3-1 indicated as follows.

$$C_4(0,0) = (C_4'(0) \mid (C_4'(0))^*) = \begin{pmatrix} 1 & i & -1 & -i & 1 & -i & -1 & i \\ -i & 1 & i & -1 & i & 1 & -i & -1 \\ 1 & -i & 1 & -i & 1 & i & 1 & i \\ i & 1 & i & 1 & -i & 1 & -i & 1 \end{pmatrix} \quad \text{EQUATION 3-1}$$

A ternary expression with only $(1, \pm i)$ is used in row vectors in a third row and a fourth row on a right side of Equation 3-1. Thus, the computing unit 220a cannot use a phase $(\pm 1, \pm i)$ of four values that may be set by each phase setting unit of four antenna elements in one calibration operation.

Thus, Equation 3-1 is broken down into an Hadamard product display as in Equation 3-2 indicated as follows.

$$C_4(0,0) = (C_4'(0) \mid (C_4'(0))^*) = \quad \text{EQUATION 3-2}$$

$$\begin{pmatrix} 1 & i & -1 & -i \\ -i & 1 & i & -1 \\ 1 & -i & (-1)\times(-1) & (-1)\times(+i) \\ i & 1 & (-1)\times(-i) & (-1)\times(-1) \end{pmatrix}$$

$$\begin{pmatrix} 1 & -i & -1 & i \\ i & 1 & -i & -1 \\ 1 & i & (-1)\times(-1) & (-1)\times(-i) \\ -i & 1 & (-1)\times(+i) & (-1)\times(-1) \end{pmatrix} =$$

$$\left( \begin{bmatrix} 1 & 1 & 1 & 1 \\ 1 & 1 & 1 & 1 \\ 1 & 1 & -1 & -1 \\ 1 & 1 & -1 & -1 \end{bmatrix} \middle| \begin{bmatrix} 1 & 1 & 1 & 1 \\ 1 & 1 & 1 & 1 \\ 1 & 1 & -1 & -1 \\ 1 & 1 & -1 & -1 \end{bmatrix} \right) \circ$$

$$\left( \begin{bmatrix} 1 & i & -1 & -i \\ -i & 1 & i & -1 \\ 1 & -i & 1 & -i \\ i & 1 & i & 1 \end{bmatrix} \middle| \begin{bmatrix} 1 & -i & -1 & i \\ i & 1 & -i & -1 \\ 1 & i & 1 & i \\ -i & 1 & -i & 1 \end{bmatrix} \right) =$$

$$I_{4,8} \circ P_{4,8}(0,0)$$

In Equation 3-2, each of a matrix $I_{4,8}$ and a matrix $P_{4,8}(0,0)$ is defined by Equation 3-3 and Equation 3-4 indicated as follows.

$$I_{4,8} = \left( \begin{bmatrix} 1 & 1 & 1 & 1 \\ 1 & 1 & 1 & 1 \\ 1 & 1 & -1 & -1 \\ 1 & 1 & -1 & -1 \end{bmatrix} \middle| \begin{bmatrix} 1 & 1 & 1 & 1 \\ 1 & 1 & 1 & 1 \\ 1 & 1 & -1 & -1 \\ 1 & 1 & -1 & -1 \end{bmatrix} \right) \quad \text{EQUATION 3-3}$$

$$P_{4,8}(0,0) = \left( \begin{bmatrix} 1 & i & -1 & -i \\ -i & 1 & i & -1 \\ 1 & -i & -1 & i \\ i & 1 & -i & -1 \end{bmatrix} \middle| \begin{bmatrix} 1 & -i & -1 & i \\ i & 1 & -i & -1 \\ 1 & i & -1 & -i \\ -i & 1 & i & -1 \end{bmatrix} \right) \quad \text{EQUATION 3-4}$$

Then, the matrix $I_{4,8}$ is used as a matrix that generates a phase value column controlling a phase of two values of 0° and 180° of each phase inverting unit. Further, the matrix $P_{4,8}$ is used as a matrix that generates a phase value column controlling a phase of four values of each phase setting unit.

In this way, the computing unit 220a can use the four-valued phase $(\pm 1, \pm i)$ in one calibration operation by combining the phase setting unit and the phase inverting unit. Thus, the computing unit 220a achieves that a repetitive measurement of a phase error needed in the methods disclosed in PTL 2 and NPL 2 is not performed.

Furthermore, even when the number of antenna elements is four, and phase values that may be set by the phase setting unit of each antenna element are four values, the calibration system 400a illustrated in FIG. 2 has a code length of eight, which is shorter than that in the calibration system according to the first example embodiment. Thus, the calibration system 400a achieves a further advantageous effect that a load when digital computing is performed may be reduced.

Note that, in a case where phase values that may be set by each phase setting unit are only four values, the antenna device 100a also achieves an advantageous effect similar to the effect described above when a matrix display acquired by breaking down the Hadamard product as represented in Equation 3-5 indicated as follows is used for generating each piece of control information by the phase control unit 230a.

$$C_4(0,0) = (C_4'(0) \mid (C_4'(0))^*) \quad \text{EQUATION 3-5}$$

$$= \begin{pmatrix} 1 & i & -1 & -i \\ -i & 1 & i & -1 \\ 1 & -i & (-1)\times(-1) & -i \\ i & 1 & i & (-1)\times(-1) \end{pmatrix}$$

$$\begin{pmatrix} 1 & -i & -1 & i \\ i & 1 & -i & -1 \\ 1 & i & (-1)\times(-1) & i \\ -i & 1 & -i & (-1)\times(-1) \end{pmatrix} =$$

$$= \left( \begin{bmatrix} 1 & 1 & 1 & 1 \\ 1 & 1 & 1 & 1 \\ 1 & 1 & -1 & 1 \\ 1 & 1 & 1 & -1 \end{bmatrix} \middle| \begin{bmatrix} 1 & 1 & 1 & 1 \\ 1 & 1 & 1 & 1 \\ 1 & 1 & -1 & 1 \\ 1 & 1 & 1 & -1 \end{bmatrix} \right) \circ$$

$$= \left( \begin{bmatrix} 1 & i & -1 & -i \\ -i & 1 & i & -1 \\ 1 & -i & -1 & -i \\ i & 1 & -i & -1 \end{bmatrix} \middle| \begin{bmatrix} 1 & -i & -1 & i \\ i & 1 & -i & -1 \\ 1 & i & -1 & -i \\ -i & 1 & -i & -1 \end{bmatrix} \right)$$

Next, a simulation example when phase values that may be set by a phase setting unit of each antenna element are four values is described.

It is assumed in the simulation example that amplitude errors of reception signals of calibration signals that reach the multiplexing unit 150a from the respective antenna elements 110aa to 110bb illustrated in FIG. 2 are 1, 0.5, 0.25, and 0.1 in this order. Further, it is assumed that phase errors of reception signals of calibration signals that reach the multiplexing unit 150a from the respective reception antennas 120aa to 120bb are 0, 2, 3, and 3 picoseconds (psec) in this order. Further, it is assumed that the calibration signal transmitter 300 illustrated in FIG. 2 transmits a sinusoidal wireless radio wave of 80 gigahertz (GHz) to the antenna device 100a.

Figure 3:
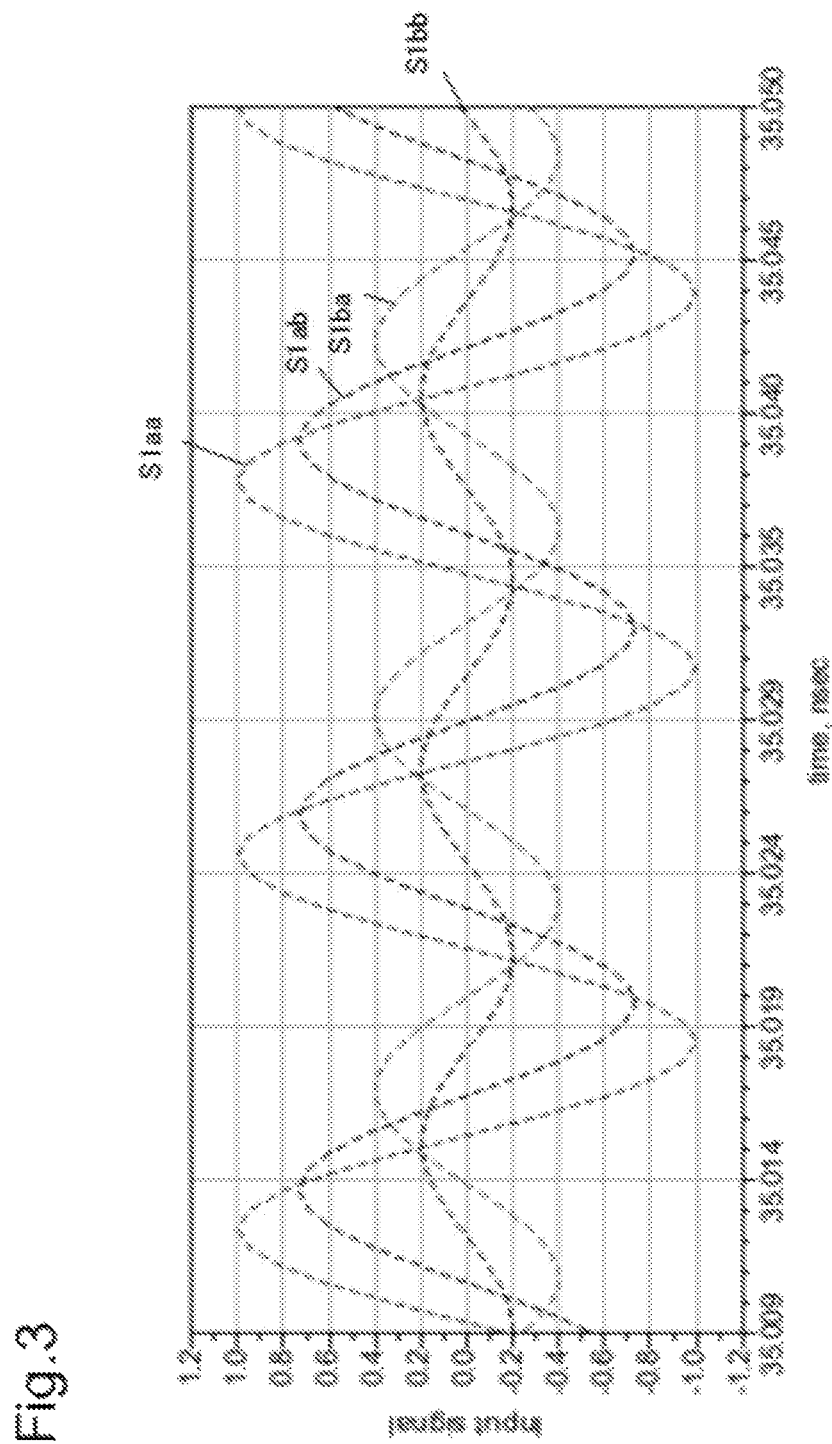
FIG. 3 is a diagram illustrating a signal from each antenna element immediately before multiplexing.

FIG. 3 is a diagram illustrating an example of each signal assumed to take place immediately before multiplexing, which is sent from each of the antenna elements 110aa to 110bb to the multiplexing unit 150a. A signal S1aa illustrated in FIG. 3 represents a signal sent from the antenna element 110aa. Further, a signal S1ab represents a signal sent from the antenna element 110ab. Further, a signal S1ba represents a signal sent from the antenna element 110ba. Further, a signal S1bb represents a signal sent from the antenna element 110bb.

FIG. 3 illustrates that an amplitude phase error as illustrated in FIG. 3 is assumed to occur in each signal.

Figure 4:
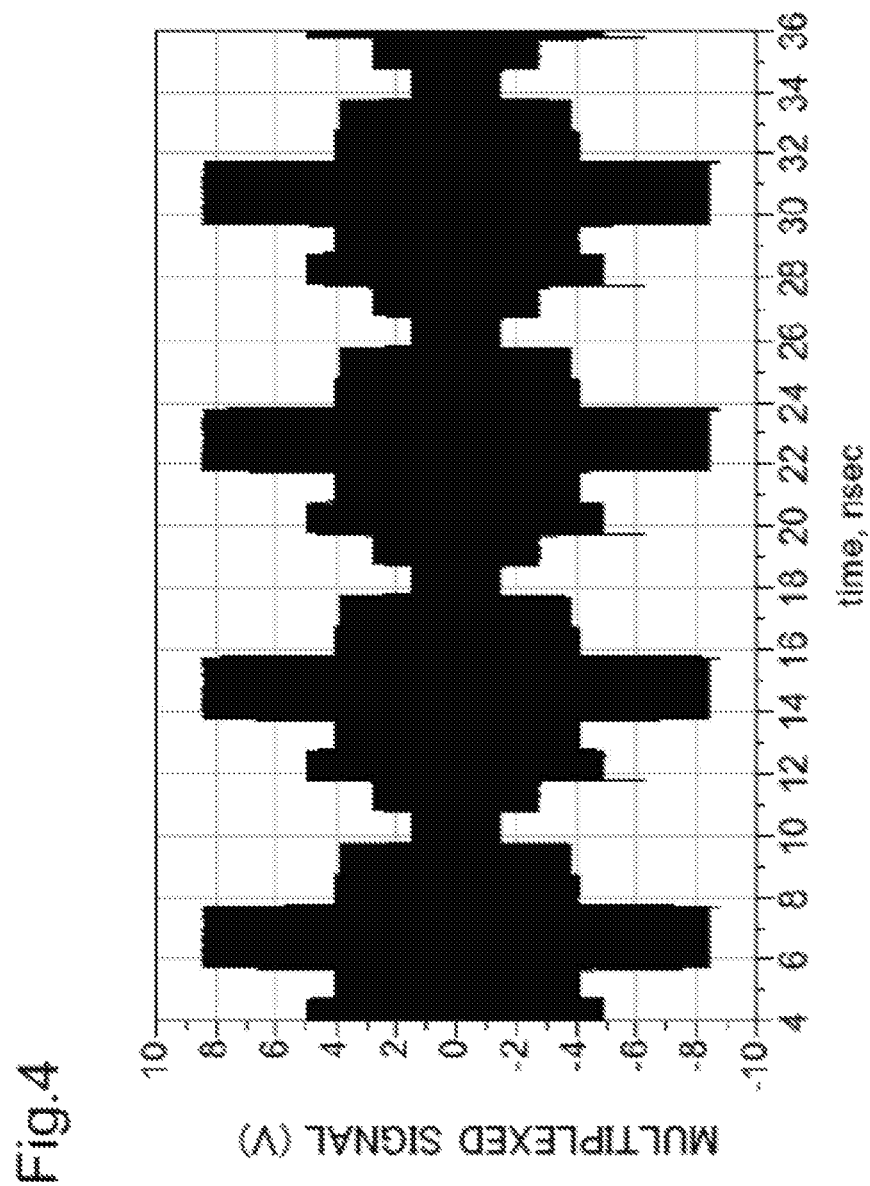
FIG. 4 is a diagram illustrating a multiplexed signal on the assumption that each signal of each antenna element is multiplexed.

FIG. 4 is a diagram illustrating a multiplexed signal acquired by multiplexing each signal illustrated in FIG. 3 by the multiplexing unit 150. The multiplexed signal is a multiplexed signal when each of the phase setting units 140aa to 140bb illustrated in FIG. 2 is controlled by a four-valued phase value column determined by each column vector $a_i$ of a matrix $C_4$ (0, 0), and four-valued phase modulation is performed at a modulation frequency 5500 MHz.

Figure 5:
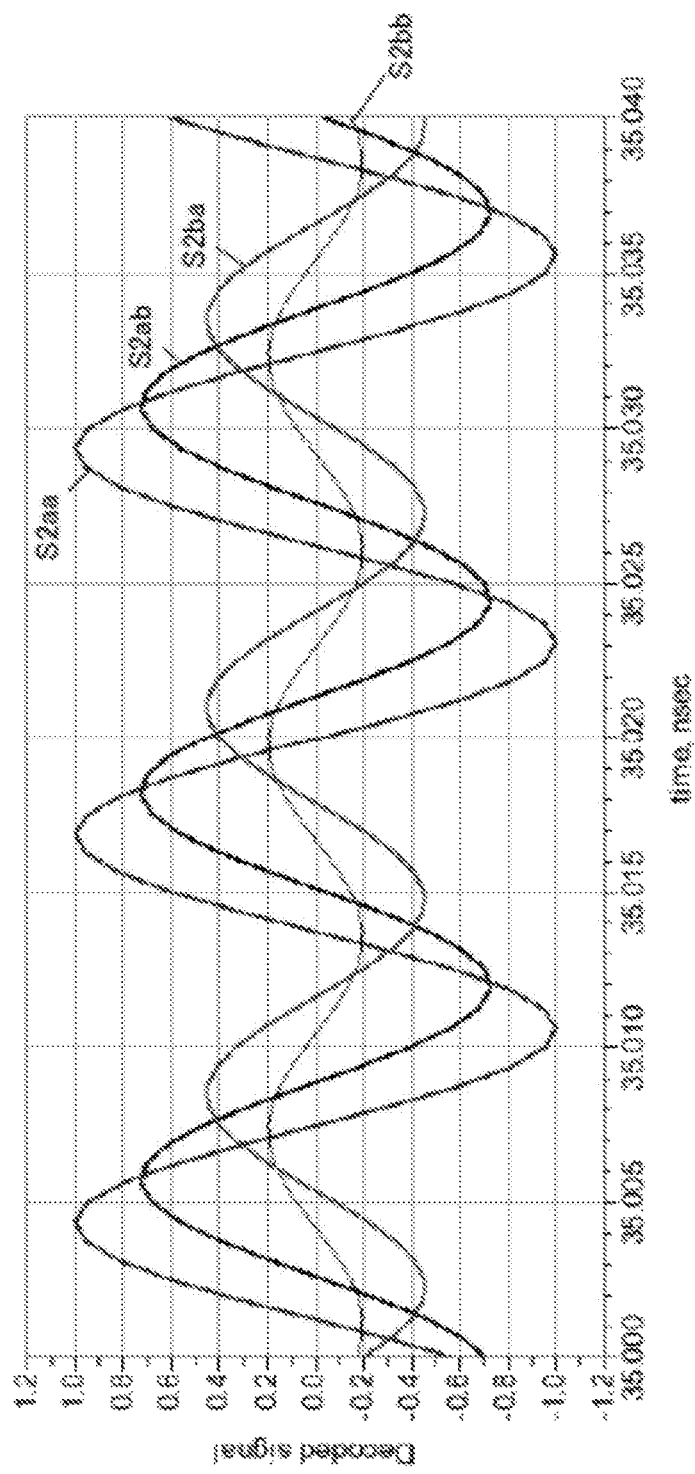
FIG. 5 is a diagram illustrating a signal acquired by decoding a multiplexed signal.

FIG. 5 is a diagram illustrating a signal acquired by decoding, by a four-valued phase value column determined by a column vector $a_i$ associated with each antenna element, the multiplexed signal illustrated in FIG. 4 having a phase modulated to four values. The signal illustrated in FIG. 5 is a signal for acquiring calibration information about an amplitude phase deviation for each of four antenna elements.

A signal S2aa illustrated in FIG. 5 represents a signal decoded by the four-valued phase value column determined by the column vector $a_i$ associated with the antenna element 110aa. Further, a signal Stab represents a signal decoded by the four-valued phase value column determined by the column vector $a_i$ associated with the antenna element 110ab. Further, a signal S2ba represents a signal decoded by the four-valued phase value column determined by the column vector $a_i$ associated with the antenna element 110ba. Further, a signal S2bb represents a signal decoded by the four-valued phase value column determined by the column vector $a_i$ associated with the antenna element 110bb.

When the signal illustrated in FIG. 3 is compared with the signal illustrated in FIG. 5, the signal illustrated in FIG. 3 and the signal illustrated in FIG. 5 have the same relative amplitude phase of a signal associated with an output of each antenna element. Thus, the signal illustrated in FIG. 5 reproduces the amplitude phase error described above.

Figure 6:
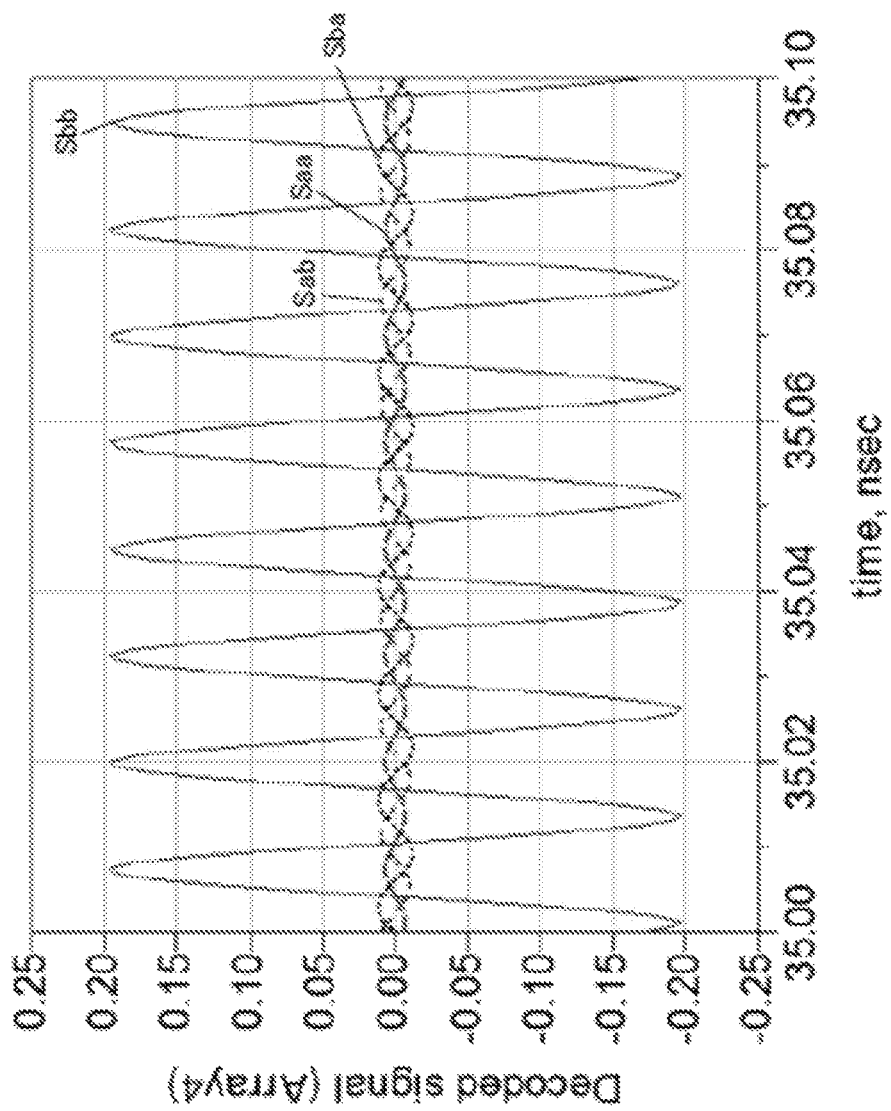
FIG. 6 is a diagram illustrating a signal acquired by decoding, by a phase value column associated with each antenna element, a signal on which four-valued phase modulation is performed.

FIG. 6 is a diagram illustrating a signal acquired by decoding, by a phase value column associated with each antenna element, a multivalued phase modulation signal on which four-valued phase modulation is performed by the phase value column associated with the antenna element 110bb. A signal Saa in FIG. 6 is a signal acquired by decoding the multivalued phase modulation signal by the phase value column associated with the antenna element 110aa. Further, a signal Sab is a signal acquired by decoding the multivalued phase modulation signal by the phase value column associated with the antenna element 110ab. Further, a signal Sba is a signal acquired by decoding the multivalued phase modulation signal by the phase value column associated with the antenna element 110ba. Further, a signal Sbb is a signal acquired by decoding the multivalued phase modulation signal by the phase value column associated with the antenna element 110bb. The signals Saa, Sab, and Sba are remarkably feebler than the signal Sbb. While FIG. 6 illustrates only a simulation result example of the antenna element 110bb as one example, a tendency that a decoded signal is extremely feeble for a phase value column that is not associated with an antenna element thereof is also applied to a signal modulated by a phase value column associated with the other antenna elements.

As described above, it can be understood that each signal illustrated in FIG. 5 being a signal for acquiring calibration information by one processing can be acquired by decoding, by a phase value column associated with each antenna element, a signal acquired by multiplexing a signal on which phase modulation is performed by a four-valued phase value column. When the signal illustrated in FIG. 5 is acquired, the correlation value and the calibration information that are described above can be derived from the signal.

Next, a case where phase values that may be set by each of the phase setting units 140aa to 140bb illustrated in FIG. 2 are eight values is described.

It is assumed that $\theta_1=0$ and $\theta_2=\pi/4$ (that is, phase values of eight values of 0°, 90°, 180°, 270°, 45°, 135°, 225°, and 315°) are used. In this case, the matrix $C_4$ represented by Equation 2-4 described in the first example embodiment is represented by Equation 3-6 indicated as follows.

$$C_4\left(0, \frac{\pi}{4}\right) = \left(C_4'(0) \mid \left(C_4'\left(\frac{\pi}{4}\right)\right)^*\right) = \left(\begin{bmatrix} 1 & i & -1 & -i \\ -i & 1 & i & -1 \\ 1 & -i & 1 & -i \\ i & 1 & i & 1 \end{bmatrix} \middle| \exp\left(-i\frac{\pi}{4}\right) \begin{bmatrix} 1 & -i & -1 & i \\ i & 1 & -i & -1 \\ 1 & i & -1 & -i \\ -i & 1 & -i & -1 \end{bmatrix}\right)$$

EQUATION 3-6

Phase values of four values of (1, −i, exp(−iπ/4), and i exp(−iπ/4)) are set in a row vector in a third row on a rightmost side of Equation 3-6. Further, phase values of four values of (1, i, −exp(−iπ/4), and −i exp(−iπ/4)) are set in a row vector in a fourth row.

Thus, phase values (±1, ±i, ±exp(−iπ/4), and ±i exp(−iπ/4)) of eight values that may be set by each phase setting unit cannot be used in one measurement of an amplitude phase deviation for all four antenna elements.

Thus, Equation 3-6 is broken down into an Hadamard product expression as in Equation 3-7 indicated as follows.

$$C_4\left(0, \frac{\pi}{4}\right) = \left(\begin{bmatrix} 1 & i & -1 & -i \\ -i & 1 & i & -1 \\ 1 & -i & (-1)\times(-1) & (-1)\times(+i) \\ i & 1 & (-1)\times(-i) & (-1)\times(-1) \end{bmatrix} \middle| \exp\left(-i\frac{\pi}{4}\right) \begin{bmatrix} 1 & -i & -1 & i \\ i & 1 & -i & -1 \\ 1 & i & (-1)\times(-1) & (-1)\times(-i) \\ -i & 1 & (-1)\times(+i) & (-1)\times(-1) \end{bmatrix}\right) =$$

EQUATION 3-7

-continued $$\left(\begin{bmatrix}1 & 1 & 1 & 1\\1 & 1 & 1 & 1\\1 & 1 & -1 & -1\\1 & 1 & -1 & -1\end{bmatrix}\begin{bmatrix}1 & 1 & 1 & 1\\1 & 1 & 1 & 1\\1 & 1 & -1 & -1\\1 & 1 & -1 & -1\end{bmatrix}\right) \circ$$

$$\left(\begin{bmatrix}1 & i & -1 & -i\\-i & 1 & i & -1\\1 & -i & -1 & i\\i & 1 & -i & -1\end{bmatrix}\exp\left(-i\frac{\pi}{4}\right)\right)$$

$$\begin{bmatrix}1 & -i & -1 & i\\i & 1 & -i & -1\\1 & i & -1 & -i\\-i & 1 & i & -1\end{bmatrix} = I_{4,8} \circ P_{4,8}\left(0, \frac{\pi}{4}\right)$$

In Equation 3-7, a matrix $P_{4,8}(0, \pi/4)$ is defined by Equation 3-8 indicated as follows.

$$P_{4,8}\left(0, \frac{\pi}{4}\right) =$$ EQUATION 3-8

$$\left(\begin{bmatrix}1 & i & -1 & -i\\-i & 1 & i & -1\\1 & -i & -1 & i\\i & 1 & -i & -1\end{bmatrix}\exp\left(-i\frac{\pi}{4}\right)\begin{bmatrix}1 & -i & -1 & i\\i & 1 & -i & -1\\1 & i & -1 & -i\\-i & 1 & i & -1\end{bmatrix}\right)$$

Further, the matrix $I_{4,8}$ is defined by Equation 3-3 described above.

Then, the matrix $I_{4,8}$ is used as a matrix that generates a phase value column controlling phase values of two values of 0° and 180° of each phase inverting unit. Further, the matrix $P_{4,8}(0, \pi/4)$ is used as a matrix that generates a phase value column controlling phase values of eight values of each phase setting unit.

In this way, the computing unit 220a can use the eight-valued phase ($\pm 1$, $\pm i$, $\pm\exp(-i\pi/4)$, and $\pm i \exp(-i\pi/4)$) in one measurement operation of a phase error by combining the phase setting unit and the phase inverting unit. Thus, the computing unit 220a can eliminate the need for a repetitive measurement of a phase error needed in the methods disclosed in PTL 2 and NPL 2.

Furthermore, even when the number of antenna elements is four, and phase values that may be set by the phase setting unit of each antenna element are four values, the calibration system 400a illustrated in FIG. 2 has a code length of eight, which is shorter than that in the calibration system according to the first example embodiment. Thus, the calibration system 400a according to the third example embodiment may reduce a load when digital computing is performed, as compared to the calibration system 400 according to the first example embodiment.

Advantageous Effect

The calibration system according to the third example embodiment achieves an advantageous effect similar to that of the calibration system according to the second example embodiment when the antenna device includes four or more antenna elements.

Note that it is assumed in the description above that each phase setting unit and each phase inverting unit are constituted in an RF frequency band on which frequency conversion is not performed as one example. However, each phase setting unit and each phase inverting unit may be constituted in an intermediate frequency band and an IF frequency band.

Further, in the description above, the example when the reception antenna device includes the plurality of antenna elements is described. However, as described in a fourth example embodiment, a similar configuration may also be applied to a transmission antenna device.

Fourth Example Embodiment

The fourth example embodiment is an example embodiment related to a calibration system for performing calibration on an amplitude phase of a plurality of transmission antenna elements included in an antenna device.

[Configuration]

Figure 7:
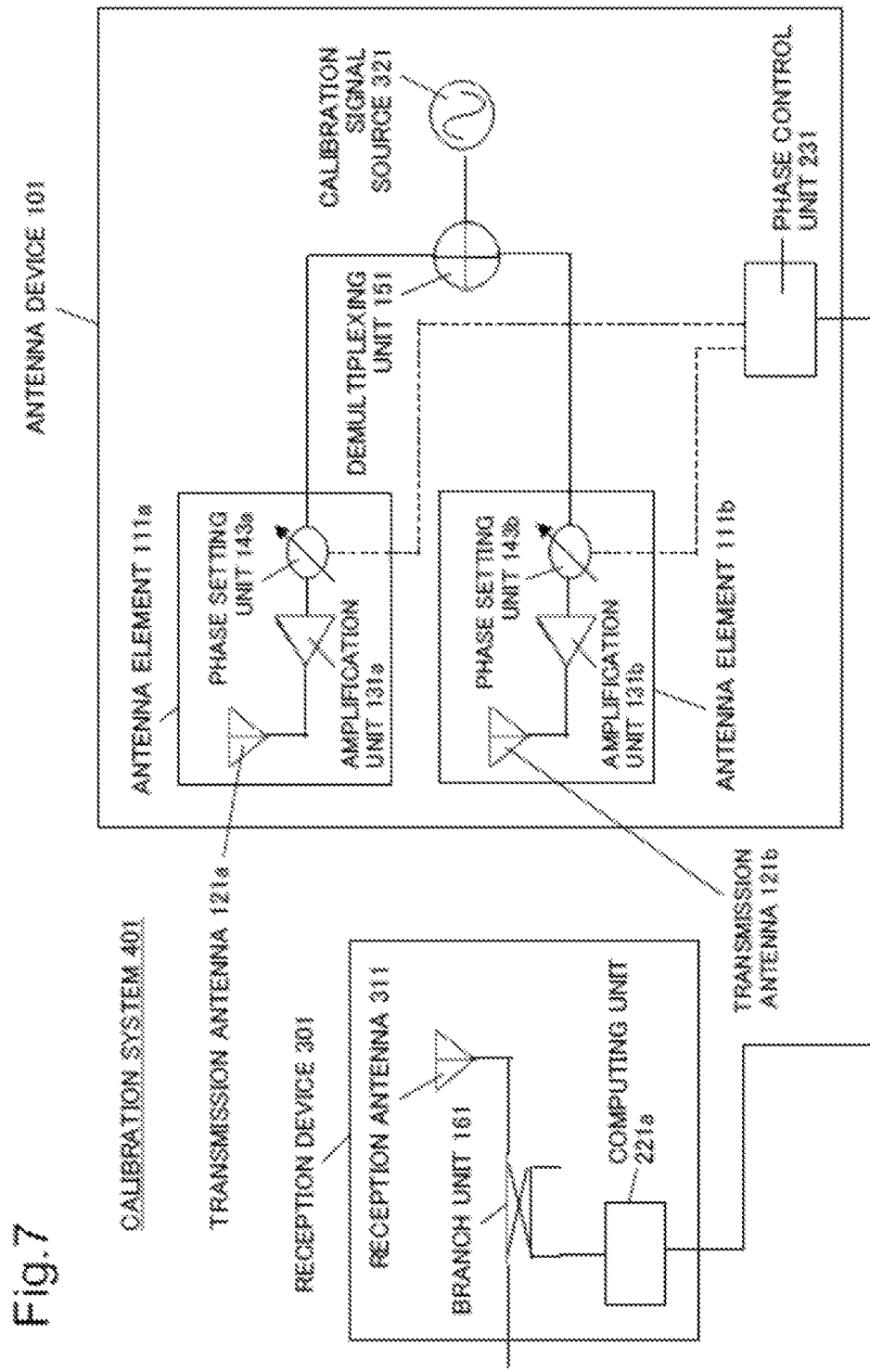
FIG. 7 is a schematic diagram illustrating a first configuration example of a calibration system according to a fourth example embodiment.

FIG. 7 is a schematic diagram illustrating a configuration of a calibration system 401 being a first example of the calibration system according to the fourth example embodiment. A path indicated by a broken line in FIG. 7 is a path of a control signal.

The calibration system 401 is a system that detects a relative amplitude phase deviation between array antenna elements by causing each phase setting unit of each antenna element illustrated in FIG. 7 to perform phase modulation of at least a four-valued phase value.

The calibration system 401 includes an antenna device 101 and a reception device 301.

The antenna device 101 includes antenna elements 111a and 111b, a demultiplexing unit 151, and a calibration signal source 321.

The calibration signal source 321 generates a calibration signal. The calibration signal source 321 sends the generated calibration signal to the demultiplexing unit 151.

The demultiplexing unit 151 demultiplexes a calibration signal input from the calibration signal source 321, and inputs the demultiplexed signal to phase setting units 143a and 143b.

A phase control unit 231 generates control information. First b control information being control information that controls a phase value set, by the phase setting unit 143a, for an input signal to the phase setting unit 143a is included in the control information. Further, second b control information being control information that controls a phase value set, by the phase setting unit 143b, for an input signal to the phase setting unit 143b is included in the control information.

As described later, the control information is, for example, information indicated by a matrix having, as an element, a phase value set by each of the phase setting units 143a and 143b. A predetermined column of the element is associated with the first b control information. Further, another column of the element is associated with the second b control information.

The phase control unit 231 generates (extracts) the first b control information and the second b control information from the generated control information. Then, the phase control unit 231 sends the first b control information to the phase setting unit 143a. Further, the phase control unit 231 sends the second b control information to the phase setting unit 143b.

Furthermore, the phase control unit 231 sends the control information not as a control signal but as a processing signal to a computing unit 221a.

The antenna element 111a includes a transmission antenna 121a, an amplification unit 131a, and the phase setting unit 143a.

The phase setting unit 143a sets a phase value of the signal sent from the demultiplexing unit 151 to a phase value included in the control information according to the control information sent from the phase control unit 231. The phase setting unit 143a sends the signal having the set phase value to the amplification unit 131a. A phase shifter and a phase unit on the market can be used as the phase setting unit 143a.

The amplification unit 131a generates a signal acquired by amplifying the signal sent from the phase setting unit 143a. The amplification unit 131a sends the amplified signal to the transmission antenna 121a. The amplification unit 131a is typically a low noise amplification unit.

The transmission antenna 121a converts the signal sent from the amplification unit 131a into a wireless radio wave. The transmission antenna 121a sends the converted wireless radio wave toward the reception device 301.

The antenna element 111b includes a transmission antenna 121b, an amplification unit 131b, and the phase setting unit 143b.

For description of the antenna element 111b, the transmission antenna 121a, the amplification unit 131a, and the phase setting unit 143a are read as the transmission antenna 121b, the amplification unit 131b, and the phase setting unit 143b, respectively, in the description of the antenna element 111a described above.

The reception device 301 includes a reception antenna 311, a branch unit 161, and the computing unit 221a.

The reception antenna 311 converts the radio wave sent from the antenna device 101 into an electric signal. The reception antenna 311 sends the converted electric signal to the branch unit 161.

The branch unit 161 separates the signal sent from the reception antenna 311 into two output signals. The branch unit 161 sends one of the two output signals to the computing unit 221a. Further, the branch unit 161 outputs the other of the two output signals to the outside of the reception device 301.

The computing unit 221a derives a correlation value being a value indicating a correlation between each of the first control information and the second control information sent from the phase control unit 231 and the signal sent from the branch unit 161. The computing unit 221a derives calibration information for calibrating each of the antenna elements 111a and 111b from the derived correlation value.

In the description above, a case where the antenna device includes the two transmission antenna elements is described. However, the antenna device may include three or more transmission antenna elements.

Note that the operation example performed by the phase control unit 231, the phase setting units 143a and 143b, and the computing unit 221a in the calibration system 401 illustrated in FIG. 7 is the same as the operation example performed by the calibration systems according to the first and second example embodiments except for the operation described above. However, when the operation described above is inconsistent with the operation example performed by the calibration systems according to the first and second example embodiments, the operation described above is prioritized.

Figure 8:
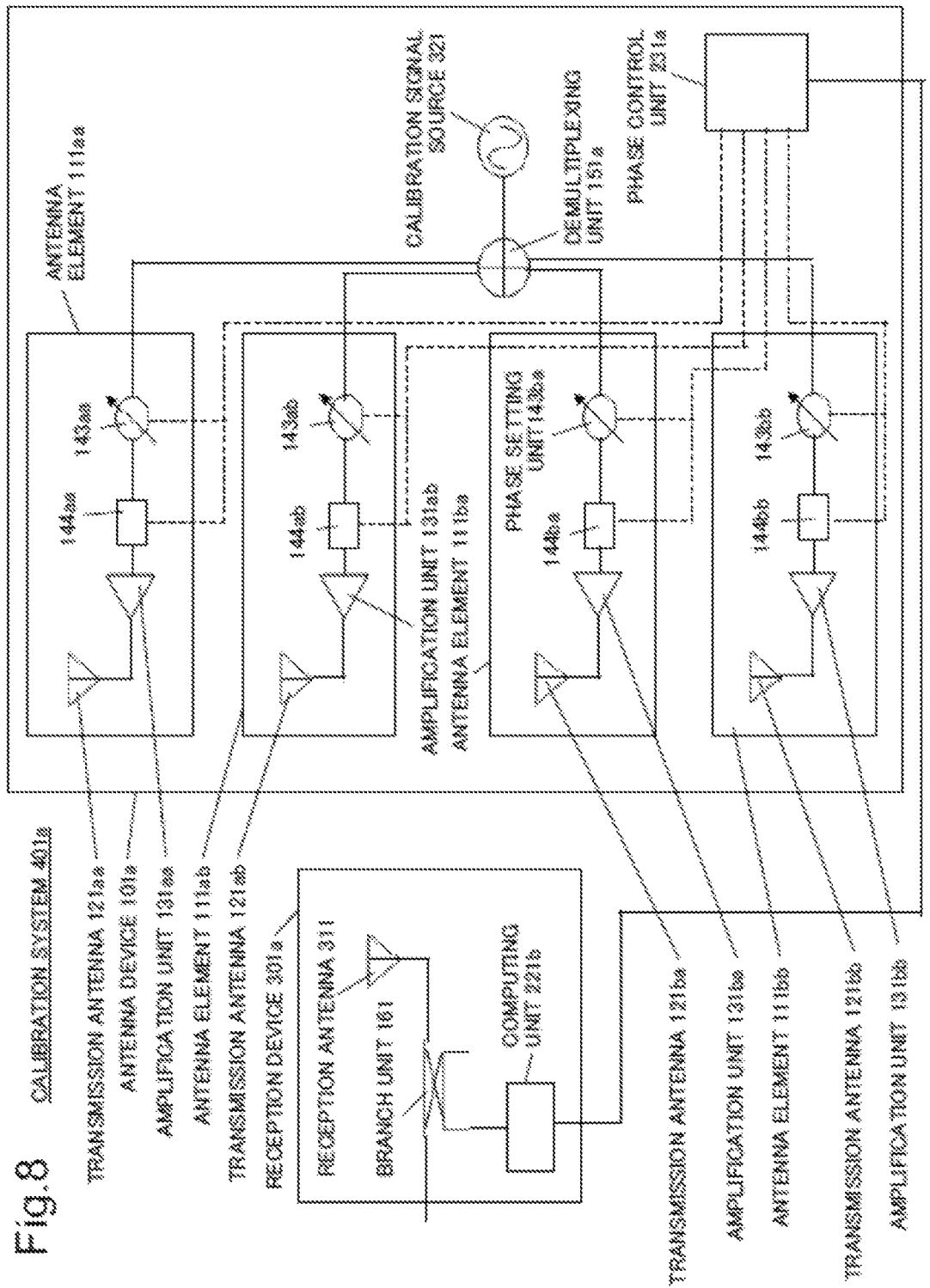
FIG. 8 is a schematic diagram illustrating a second configuration example of the calibration system according to the fourth example embodiment.

FIG. 8 is a schematic diagram illustrating a configuration of a calibration system 401a being a second example of the calibration system according to the fourth example embodiment. Note that a path indicated by a broken line in FIG. 8 is a path of a control signal.

The calibration system 401a includes an antenna device 101a and a reception device 301a.

The antenna device 101a is a device that detects a relative amplitude phase deviation between antenna elements by causing each phase setting unit of each antenna element to perform phase modulation of at least a four-valued phase value.

The antenna device 101a includes antenna elements 111aa to 111bb, a demultiplexing unit 151a, a calibration signal source 321, and a phase control unit 231a.

The calibration signal source 321 generates a calibration signal. The calibration signal source 321 sends the generated calibration signal to the demultiplexing unit 151a.

The demultiplexing unit 151a demultiplexes a calibration signal input from the calibration signal source 321, and inputs the demultiplexed signal to each of phase setting units 143aa to 143bb.

The phase control unit 231a generates B control information.

First B control information being control information that controls a phase value set for an input signal by the phase setting unit 143aa is included in the B control information. Further, second B control information being control information that controls a phase value set for an input signal by the phase setting unit 143ab is included in the B control information. Further, third B control information being control information that controls a phase value set for an input signal by the phase setting unit 143ba is included in the B control information. Further, fourth B control information being control information that controls a phase value set for an input signal by the phase setting unit 143bb is included in the B control information.

Fifth B control information being control information indicating whether or not a phase inverting unit 144aa inverts a phase of an input signal is included in the B control information. Sixth B control information being control information indicating whether or not a phase inverting unit 144ab inverts a phase of an input signal is included in the B control information. Seventh B control information being control information indicating whether or not a phase inverting unit 144ba inverts a phase of an input signal is included in the B control information. Eighth B control information being control information indicating whether or not a phase inverting unit 144bb inverts a phase of an input signal is included in the B control information.

As described later, the B control information is, for example, information indicated by a matrix having, as an element, a phase value set by each of the phase setting units 143aa to 143bb and the phase inverting units 144aa to 144bb. Then, for example, a predetermined column of the element is associated with each piece of the first B to eighth B control information.

The phase control unit 231a generates (extracts) each piece of the first B control information to the fourth B control information from the generated B control information.

Then, the phase control unit 231a sends the first B control information to the phase setting unit 143aa. Further, the phase control unit 231a sends the second B control information to the phase setting unit 143ab. Further, the phase control unit 231a sends the third B control information to the phase setting unit 143ba. Further, the phase control unit 231a sends the fourth B control information to the phase setting unit 143bb. Further, the phase control unit 231a sends the fifth B control information to the phase inverting unit 144aa. Further, the phase control unit 231a sends the sixth B control information to the phase inverting unit 144ab. Further, the phase control unit 231a sends the seventh B control information to the phase inverting unit 144*ba*. Further, the phase control unit 231*a* sends the eighth B control information to the phase inverting unit 144*bb*.

Furthermore, the phase control unit 231*a* sends the above-described B control information not as a control signal but as a processing signal to a computing unit 221*b*.

The antenna element 111*aa* includes a transmission antenna 121*aa*, an amplification unit 131*aa*, the phase setting unit 143*aa*, and the phase inverting unit 144*aa*.

The phase setting unit 143*aa* sets a phase value of the signal sent from the demultiplexing unit 151*a* to a phase value included in the control information according to the control information sent from the phase control unit 231*a*.

The phase inverting unit 144*aa* inverts a phase of the signal sent from the phase setting unit 143*aa* according to the above-described fifth B control information sent from the phase control unit 231*a*.

The amplification unit 131*aa* generates a signal acquired by amplifying the signal sent from the phase inverting unit 144*aa*. The amplification unit 131*aa* sends the amplified signal to the transmission antenna 121*aa*. The amplification unit 131*aa* is typically a low noise amplification unit.

The transmission antenna 121*aa* converts the signal sent from the amplification unit 131*aa* into a wireless radio wave. The transmission antenna 121*aa* sends the converted wireless radio wave toward the reception device 301*a*.

The antenna element 111*ab* includes a transmission antenna 121*ab*, an amplification unit 131*ab*, the phase setting unit 143*ab*, and the phase inverting unit 144*ab*.

For description of the antenna element 111*ab*, the following reading is performed on the description of the antenna element 111 as described above. In other words, the transmission antenna 121*aa* is read as the transmission antenna 121*ab*. Further, the amplification unit 131*aa* is read as the amplification unit 131*ab*. Further, the phase setting unit 143*aa* is read as the phase setting unit 143*ab*. Further, the phase inverting unit 144*aa* is read as the phase inverting unit 144*aa*.

The antenna element 111*ba* includes a transmission antenna 121*ba*, an amplification unit 131*ba*, the phase setting unit 143*ba*, and the phase inverting unit 144*ba*.

For description of the antenna element 111*ba*, the following reading is performed on the description of the antenna element 111*aa* described above. In other words, the transmission antenna 121*aa* is read as the transmission antenna 121*ba*. Further, the amplification unit 131*aa* is read as the amplification unit 131*ba*. Further, the phase setting unit 143*aa* is read as the phase setting unit 143*ba*. Further, the phase inverting unit 144*aa* is read as the phase inverting unit 144*ba*.

The antenna element 111*bb* includes a transmission antenna 121*bb*, an amplification unit 131*bb*, the phase setting unit 143*bb*, and the phase inverting unit 144*bb*.

For description of the antenna element 111*bb*, the following reading is performed on the description of the antenna element 111 as described above. In other words, the transmission antenna 121*aa* is read as the transmission antenna 121*bb*. Further, the amplification unit 131*aa* is read as the amplification unit 131*bb*. Further, the phase setting unit 143*aa* is read as the phase setting unit 143*bb*. Further, the phase inverting unit 144*aa* is read as the phase inverting unit 144*bb*.

The reception device 301*a* includes a reception antenna 311, a branch unit 161, and the computing unit 221*b*.

The reception antenna 311 converts the radio wave sent from the antenna device 101*a* into an electric signal. The reception antenna 311 sends the converted electric signal to the branch unit 161.

The branch unit 161 separates the signal sent from the reception antenna 311 into two output signals. The branch unit 161 sends one of the two output signals to the computing unit 221*b*. Further, the branch unit 161 outputs the other of the two output signals to the outside of the reception device 301*a*.

The computing unit 221*b* derives a correlation value being a value indicating a correlation between each of signals sent from the phase control unit 231*a* and the signal sent from the branch unit 161. For a first one, each of the signals is control information acquired by combining the first B control information and the fifth B control information. For a second one, each of the signals is control information acquired by combining the second B control information and the sixth B control information. For a third one, each of the signals is control information acquired by combining the third B control information and the seventh B control information. For a fourth one, each of the signals is control information acquired by combining the fourth B control information and the eighth B control information.

The computing unit 221*b* derives calibration information for calibrating each of the antenna elements 111*aa* to 111*bb* from the derived correlation value.

In the description above, a case where the antenna device includes the two transmission antenna elements is described. However, the antenna device may include three or more transmission antenna elements.

Note that the operation example performed by the phase control unit 231*a*, the phase setting units 143*aa* to 143*bb*, and the computing unit 221*b* in the calibration system 401*a* illustrated in FIG. 8 is the same as the operation example performed by the calibration system according to the third example embodiment except for the operation described above. However, when the operation described above is inconsistent with the operation example performed by the calibration system according to the third example embodiment, the operation described above is prioritized.

Advantageous Effect

In the antenna device including the plurality of transmission antenna elements, the calibration system according to the fourth example embodiment may output a correlation value being information for performing a phase adjustment between the antenna elements. Thus, in the antenna device including the plurality of transmission antenna elements, the calibration system achieves a phase adjustment between the antenna elements.

Figure 9:
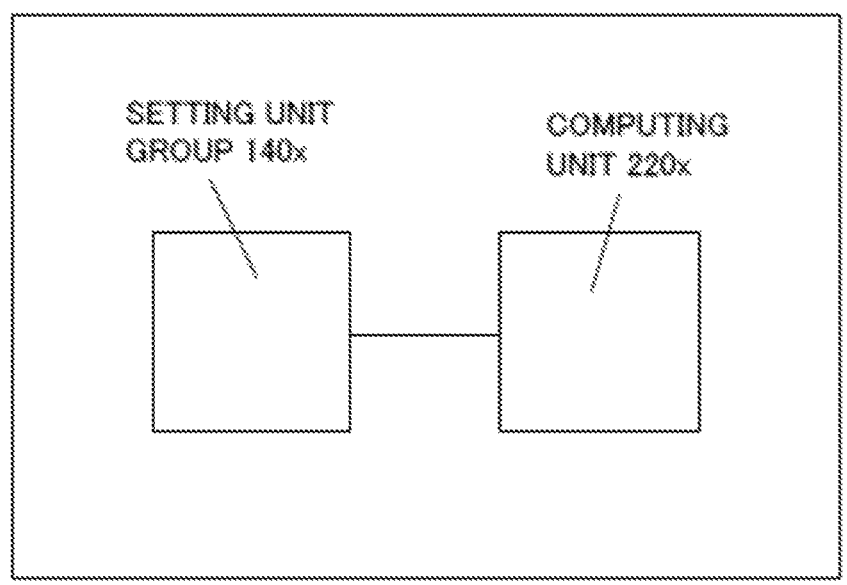
FIG. 9 is a block diagram illustrating a minimum configuration of a processing device according to the example embodiments.

FIG. 9 is a block diagram illustrating a configuration of a processing device 100*x* being a minimum configuration of a processing device according to the example embodiments described above.

The processing device 100*x* includes a setting unit group 140*x* and a computing unit 220*x*.

The setting unit group 140*x* performs, with information extracted from one piece of control information, setting from a predetermined three or more-valued phase value on a phase value of a reception signal by each of a plurality of antenna elements or a transmission signal from each of the antenna elements for a calibration signal. Further, the setting unit group 140*x* derives a setting signal being a signal on which the setting is performed.

The computing unit 220*x* outputs a correlation value being a value indicating a correlation between a sum of the setting signals and the control information.

The processing device 100*x* performs the setting for deriving a correlation value with one piece of control information. Thus, the processing device 100x can substantially simultaneously complete the setting for a plurality of reception signals or a plurality of reception signals.

Then, the processing device 100x outputs a correlation value being a value indicating a correlation between a sum of the setting signals and the control information. Therefore, the processing device 100x can derive the correlation value at once.

In other words, the processing device 100x can perform the setting and derivation of the correlation value in a short time.

Thus, the processing device 100x with the above-described configuration achieves the advantageous effect described in the section of [Advantageous Effects of Invention].

Each of the example embodiments of the present invention is described above, but the present invention is not limited to the example embodiments described above, and further modification, replacement, and adjustment can be added without departing from a basic technical idea of the present invention. For example, a configuration of an element illustrated in each of the drawings is one example for facilitating understanding of the present invention, and the present invention is not limited to the configuration illustrated in the drawings.

The whole or part of the example embodiments disclosed above can be described as, but not limited to, the following supplementary notes.

(Supplementary Note 1)
A processing device, including:
a setting unit group that performs, with information extracted from one piece of control information, setting from a predetermined three or more-valued phase value on a phase value of a reception signal by each of a plurality of antenna elements or a transmission signal from each of the antenna elements for a calibration signal, and derives a setting signal being a signal on which the setting is performed; and
a computing unit that outputs a correlation value being a value indicating a correlation between a sum of the setting signals and the control information.

(Supplementary Note 2)
The processing device according to supplementary note 1, wherein
the control information includes a phase value column group constituted of phase value columns sent to each setting unit of the setting unit group.

(Supplementary Note 3)
The processing device according to supplementary note 2, wherein
each of the phase value columns is expressed by the three or more-valued phase value.

(Supplementary Note 4)
The processing device according to supplementary note 2 or 3, wherein
each of the phase value columns is generated by a third matrix acquired by expanding, in a row direction, an Hadamard matrix being a matrix that generates an orthogonal code and a second matrix acquired by performing phase rotation on the Hadamard matrix.

(Supplementary Note 5)
The processing device according to supplementary note 1, wherein
the setting is performed by first setting being the setting related to a first phase value with the control information, and second setting being the setting related to a second phase value with the control information for a signal on which the first setting is performed.

(Supplementary Note 6)
The processing device according to supplementary note 5, wherein
the first setting is the setting performed from predetermined three or more phase values, and the second setting is the setting performed from predetermined two or more phase values.

(Supplementary Note 7)
The processing device according to supplementary note 6, wherein
the two or more phase values are two phase values, and a phase difference between one and another of the two phase values is 180 degrees.

(Supplementary Note 8)
The processing device according to any one of supplementary notes 5 to 7, wherein
the control information includes a phase value column group constituted of phase value columns sent to each setting unit of the setting unit group.

(Supplementary Note 9)
The processing device according to supplementary note 8, wherein each of the phase value columns is expressed by the three or more-valued phase value.

(Supplementary Note 10)
The processing device according to supplementary note 8 or 9, wherein
each of the phase value columns is generated by a matrix acquired by expanding, in a row direction, a square matrix having a multivalued phase as an element and a conjugate matrix of the square matrix.

(Supplementary Note 11)
The processing device according to any one of supplementary notes 1 to 10, wherein
the plurality of antenna elements are included in an identical antenna device.

(Supplementary Note 12)
A calibration device, including:
the processing device according to any one of supplementary notes 1 to 11; and a derivation unit that derives a calibration coefficient for performing calibration of the plurality of antenna elements from the correlation value.

(Supplementary Note 13)
A processing device, including:
a first setting unit that performs, with first control information, first setting being setting from a predetermined three or more-valued phase value on a phase value of a first signal being a reception signal by a first antenna for a transmitted calibration signal;
a second setting unit that performs, with second control information, second setting being setting from the three or more-valued phase value on a phase value of a second signal being a reception signal by a second antenna for the calibration signal;
a multiplexing unit that generates a multiplexed signal acquired by multiplexing a first signal on which the first setting is performed and a second signal on which the second setting is performed;
a control unit that performs sending of the first control information to the first setting unit and sending of the second control information to a second setting unit; and
a processing unit that outputs a correlation value being a value indicating a correlation between the multiplexed signal, and the first control information and the second control information.

(Supplementary Note 14)

The processing device according to supplementary note 13, wherein both of the first antenna and the second antenna are included in an identical antenna device.

(Supplementary Note 15)

The processing device according to supplementary note 13 or 14, wherein the first control information includes a first phase value column being a column of phase values that may cause the first setting unit to set a phase value of the first signal to the three or more-valued phase value, and a second phase value column being a column of phase values that may cause the second setting unit to set a phase value of the second signal to the three or more-valued phase value.

(Supplementary Note 16)

A processing method, including:

performing, with information extracted from one piece of control information, setting from a predetermined three or more-valued phase value on a phase value of a reception signal by each of a plurality of antenna elements for a transmitted calibration signal;

generating a multiplexed signal acquired by mutually multiplexing each of the reception signals on which the setting is performed; and outputting a correlation value being a value indicating a correlation between the multiplexed signal and the control information.

(Supplementary Note 17)

A processing method, including:

performing, with one piece of control information, first setting being setting from a predetermined three or more-valued phase value on a phase value of a reception signal by each of a plurality of antenna elements for a transmitted calibration signal;

performing, with the control information, second setting being setting from a two or more-valued phase value on each reception signal on which the first setting is performed;

generating a multiplexed signal acquired by mutually multiplexing each piece of reception information on which the first setting and the second setting are performed; and outputting a correlation value being a value indicating a correlation between the multiplexed signal and the control information.

(Supplementary Note 18)

A processing program causing a computer to execute:

processing of performing, with information extracted from one piece of control information, setting from a predetermined three or more-valued phase value on a phase value of a reception signal by each of a plurality of antenna elements for a transmitted calibration signal;

processing of generating a multiplexed signal acquired by mutually multiplexing each of the reception signals on which the setting is performed; and processing of outputting a correlation value being a value indicating a correlation between the multiplexed signal and the control information.

(Supplementary Note 19)

A processing program causing a computer to execute:

processing of performing, with one piece of control information, first setting being setting from a predetermined three or more-valued phase value on a phase value of a reception signal by each of a plurality of antenna elements for a transmitted calibration signal;

processing of performing, with the control information, second setting being setting from a two or more-valued phase value on each reception signal on which the first setting is performed;

processing of generating a multiplexed signal acquired by mutually multiplexing each piece of reception information on which the first setting and the second setting are performed; and processing of outputting a correlation value being a value indicating a correlation between the multiplexed signal and the control information.

(Supplementary Note 20)

A calibration device of an array antenna that calibrates an amplitude phase of each antenna element, based on a calibration coefficient, the calibration device including:

first phase control means (phase unit) capable of selecting at least a three or more-valued phase value, based on a phase value column in which a phase of a reception signal of a calibration signal received by each antenna element constituting an array antenna is set;

a multiplexed signal of a reception signal of each antenna element and the first phase control means; and calibration coefficient calculation means for calculating a calibration coefficient between all antenna elements constituting an array antenna, based on an acquired cross-correlation value, wherein the phase value column is expressed by a three or more-valued phase value between antenna elements.

(Supplementary Note 21)

A calibration device of an array antenna that calibrates an amplitude phase of each antenna element, based on a calibration coefficient, the calibration device including:

first phase control means (phase unit) capable of selecting at least a three or more-valued phase value, based on a phase value column in which a phase of a reception signal of a calibration signal received by each antenna element constituting an array antenna is set;

second phase control means (180° phase inverting circuit) capable of selecting at least a two-valued phase value, based on the phase value column, separately from the first phase control means;

correlation computing means for acquiring a cross-correlation value of a multiplexed signal of a reception signal of each antenna element and the phase value column used in the first phase control means and a second phase control means; and calibration coefficient calculation means for calculating a calibration coefficient between all antenna elements constituting an array antenna, based on a cross-correlation value acquired by the correlation computing means, wherein the phase value column is expressed by a three or more-valued phase value.

(Supplementary Note 22)

The calibration device of an array antenna according to supplementary note 21, wherein the phase value column is generated by a third matrix acquired by expanding, in a row direction, an Hadamard matrix being a matrix that generates an orthogonal code and a second matrix acquired by performing phase rotation on the Hadamard matrix.

(Supplementary Note 23)

The calibration device of an array antenna according to supplementary note 21 or 22, wherein the phase value column is generated by a fifth matrix acquired by expanding, in a row direction, a square matrix having a multivalued phase as an element, and a fourth matrix being conjugate of the square matrix.

While the invention has been particularly shown and described with reference to example embodiments thereof, the invention is not limited to these embodiments. It will be understood by those of ordinary skill in the art that various changes inform and details may be made therein without departing from the spirit and scope of the present invention as defined by the claims.

This application is based upon and claims the benefit of priority from Japanese patent application No. 2017-082710 filed on Apr. 19, 2017, the disclosure of which is incorporated herein in its entirety by reference.

REFERENCE SIGNS LIST 100, 100a Antenna device
100x Processing device
110a, 110b, 110aa, 110ab, 110ba, 110bb, 111a, 111b, 111aa, 111ab, 111ba, 111bb Antenna element
120a, 120b, 120aa, 120ab, 120ba, 120bb, 311 Reception antenna
121a, 121b, 121aa, 121ab, 121ba, 121bb, 310 Transmission antenna
130a, 130b, 130aa, 130ab, 130ba, 130bb, 131a, 131b, 131aa, 131ab, 131ba, 131bb Amplification unit
140a, 140b, 140aa, 140ab, 140ba, 140bb, 143a, 143b, 143aa, 143ab, 143ba, 143bb Phase setting unit
140x Setting unit group
141aa, 141ab, 141ba, 141bb, 144aa, 144ab, 144ba, 144bb Phase inverting unit
150 Multiplexing unit
151, 151a Demultiplexing unit
160, 161 Branch unit
220, 220a, 221a, 221b Computing unit
220x Computing unit
230, 230a, 231, 231a Phase control unit
300 Calibration signal transmitter
301 Reception device
320, 321 Calibration signal source
400, 400a, 401, 401a Calibration system
Saa, Sab, Sba, Sbb, S1aa, Slab, S1ba, S1ba, S2aa, S2ab, S2ba, S2bb Signal

What is claimed is:

1. A processing device, including:
a setting unit group that performs, with information extracted from one piece of control information, setting from a predetermined three or more-valued phase value on a phase value of a reception signal by each of a plurality of antenna elements or a transmission signal from each of the antenna elements for a calibration signal, and derives a setting signal being a signal on which the setting is performed; and
a computing unit that outputs a correlation value being a value indicating a correlation between a sum of the setting signals and the control information.

2. The processing device according to claim 1, wherein the control information includes a phase value column group constituted of phase value columns sent to each setting unit of the setting unit group.

3. The processing device according to claim 2, wherein each of the phase value columns is expressed by the three or more-valued phase value.

4. The processing device according to claim 2, wherein each of the phase value columns is generated by a third matrix acquired by expanding, in a row direction, an Hadamard matrix being a matrix that generates an orthogonal code and a second matrix acquired by performing phase rotation on the Hadamard matrix.

5. The processing device according to claim 1, wherein the setting is performed by first setting being the setting related to a first phase value with the control information, and second setting being the setting related to a second phase value with the control information for a signal on which the first setting is performed.

6. The processing device according to claim 5, wherein the first setting is the setting performed from predetermined three or more phase values, and the second setting is the setting performed from predetermined two or more phase values.

7. The processing device according to claim 6, wherein the two or more phase values are two phase values, and a phase difference between one and another of the two phase values is 180 degrees.

8. The processing device according to claim 5, wherein the control information includes a phase value column group constituted of phase value columns sent to each setting unit of the setting unit group.

9. The processing device according to claim 8, wherein each of the phase value columns is expressed by the three or more-valued phase value.

10. The processing device according to claim 8, wherein each of the phase value columns is generated by a matrix acquired by expanding, in a row direction, a square matrix having a multivalued phase as an element and a conjugate matrix of the square matrix.

11. The processing device according to claim 1, wherein the plurality of antenna elements are included in an identical antenna device.

12. A calibration device, including:
The processing device according to claim 1; and a derivation unit that derives a calibration coefficient for performing calibration of the plurality of antenna elements from the correlation value.

13. A processing method, including:
performing, with one piece of control information, first setting being setting from a predetermined three or more-valued phase value on a phase value of a reception signal by each of a plurality of antenna elements for a transmitted calibration signal;
performing, with the control information, second setting being setting from a two or more-valued phase value on each reception signal on which the first setting is performed;
generating a multiplexed signal acquired by mutually multiplexing each piece of reception information on which the first setting and the second setting are performed; and
outputting a correlation value being a value indicating a correlation between the multiplexed signal and the control information.

14. A non-transitory computer readable recording medium recording a processing program causing a computer to execute:
processing of performing, with information extracted from one piece of control information, setting from a predetermined three or more-valued phase value on a phase value of a reception signal by each of a plurality of antenna elements for a transmitted calibration signal;
processing of generating a multiplexed signal acquired by mutually multiplexing each of the reception signals on which the setting is performed; and
processing of outputting a correlation value being a value indicating a correlation between the multiplexed signal and the control information.

* * * * *